United States Patent
Yamada et al.

(10) Patent No.: US 10,839,261 B2
(45) Date of Patent: Nov. 17, 2020

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Daisuke Yamada, Kawasaki (JP); Masahiro Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 64 days.

(21) Appl. No.: 15/927,670

(22) Filed: Mar. 21, 2018

(65) Prior Publication Data

US 2018/0276501 A1    Sep. 27, 2018

(30) Foreign Application Priority Data

Mar. 24, 2017 (JP) .................................. 2017-058864

(51) Int. Cl.
*G06K 9/62* (2006.01)
*G06T 7/70* (2017.01)
(Continued)

(52) U.S. Cl.
CPC ............ *G06K 9/6256* (2013.01); *B25J 9/163* (2013.01); *B25J 9/1656* (2013.01); *B25J 9/1697* (2013.01); *G06K 9/00201* (2013.01); *G06K 9/00664* (2013.01); *G06K 9/2027* (2013.01); *G06K 9/3208* (2013.01); *G06K 9/4628* (2013.01); *G06K 9/627* (2013.01); *G06T 7/70* (2017.01);
(Continued)

(58) Field of Classification Search
CPC ......... B25J 9/1612; G05B 2219/39476; G05B 2219/39527; G05B 2219/39543; G05B 2219/40053
See application file for complete search history.

(56) References Cited

U.S. PATENT DOCUMENTS

| | | | |
|---|---|---|---|
| 2011/0103652 A1* | 5/2011 | Saruta | G06K 9/4671 382/106 |
| 2013/0006423 A1* | 1/2013 | Ito | B25J 9/1612 700/259 |
| 2018/0089589 A1* | 3/2018 | Ooba | G05B 19/4182 |

FOREIGN PATENT DOCUMENTS

JP    2012-088787 A    5/2012

OTHER PUBLICATIONS

Graduate School of Engineering, Chubu University; "Efficient Learning Method for Human Detection based on Automatic Generation of Training Samples with the Negative-Bag MILBoost"; Kasugai, Aichi, Japan; MIRU2012; Aug. 2012.

* cited by examiner

*Primary Examiner* — Ross Varndell
(74) *Attorney, Agent, or Firm* — Canon U.S.A., Inc. IP Division

(57) ABSTRACT

An information processing apparatus includes a first obtaining unit configured to obtain a holding position and orientation of a manipulator when holding of a target object is performed and holding success or failure information of the target object in the holding position and orientation, a second obtaining unit configured to obtain an image in which the target object is imaged when the holding of the target object is performed, and a generation unit configured to generate learning data when the holding of the target object by the manipulator is learnt on a basis of the holding position and orientation and the holding success or failure (Continued)

information obtained by the first obtaining unit and the image obtained by the second obtaining unit.

20 Claims, 12 Drawing Sheets

(51) Int. Cl.
    *G06K 9/00*           (2006.01)
    *G06K 9/32*           (2006.01)
    *B25J 9/16*            (2006.01)
    *G06K 9/20*           (2006.01)
    *G06K 9/46*           (2006.01)
(52) U.S. Cl.
    CPC .............. *G05B 2219/39295* (2013.01); *G05B 2219/39536* (2013.01); *G06T 2207/20081* (2013.01)

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a program.

Description of the Related Art

Up to now, a technique for learning a feature or a pattern of a target object from an image obtained by imaging (capturing) the target object or a depth image (range image) and recognizing the target object has been proposed. In this case, to improve a recognition capability for the target object, learning data is to be used which is obtained by imaging the target object in various orientations and sizes and assigning labels appropriate to the recognitions with respect to the respective captured images as training signals. For example, to recognize a center position of the target object, the target object is imaged from various positions and orientations, and the center positions of the target objects in the respective images are to be defined. In this manner, the generation of the learning data takes much labor.

In view of the above, a method of increasing virtually appearing variations has been proposed as a technology related to collection of the learning data. Japanese Patent Laid-Open No. 2012-88787 proposes a method of increasing the variations by applying image processing such as expansion, reduction, and rotation to the captured image. In addition, according to Masamitsu Tsuchiya and two others, "Efficient Learning Method for Human Detection based on Automatic Generation of Training Samples with the Negative-Bag MILBoost", The Meeting on Image Recognition and Understanding (MIRU 2012), August 2012, a method of creating virtual captured images by using computer graphics (CG) has been proposed.

In a robot system where the target object is to be held by using a robot, even when the recognition of the target object succeeds, the holding of the target object may fail in some case. In view of the above, it is plausible to improve a holding success rate by learning the recognition and the holding of the target object in combination. However, in a case where the holding of the target object is learnt, only one piece of learning data is obtained with respect to a single holding operation, and an issue occurs that the learning takes much time.

SUMMARY OF THE INVENTION

In view of the above, embodiments of the present invention aim at easily generating the learning data for holding the target object.

To address the above-described issue, an information processing apparatus according to embodiments of the present invention includes a first obtaining unit configured to obtain a holding position and orientation of a manipulator when holding of a target object is performed and holding success or failure information of the target object in the holding position and orientation, a second obtaining unit configured to obtain an image in which the target object is imaged when the holding of the target object is performed, and a generation unit configured to generate learning data when the holding of the target object by the manipulator is learnt on a basis of the holding position and orientation and the holding success or failure information obtained by the first obtaining unit and the image obtained by the second obtaining unit.

Further features of the present invention will become apparent from the following description of exemplary embodiments with reference to the attached drawings.

DESCRIPTION OF THE EMBODIMENTS

Hereinafter, exemplary embodiments of the present invention will be described in detail with reference to the accompanying drawings. It should be noted that the exemplary embodiments to be described below are examples of devices that realize the present invention and are to be appropriately modified or altered depending on a configuration and various conditions of an apparatus to which the present invention is applied, and the present invention is not limited to the following exemplary embodiments.

First Exemplary Embodiment

Figure 1:
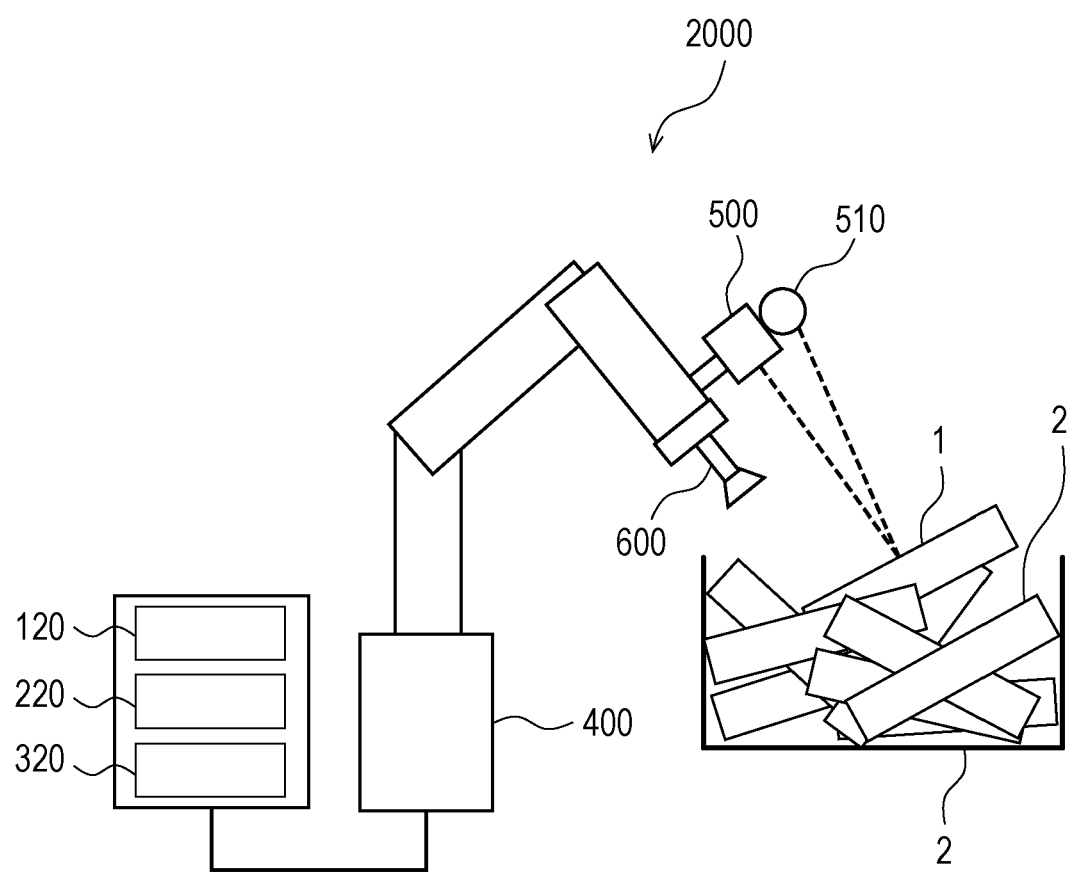
FIG. 1 illustrates a configuration example of a robot system according to a first exemplary embodiment.

FIG. 1 illustrates a configuration example of an object recognition and holding apparatus 2000 including an information processing apparatus 120 according to the present exemplary embodiment. A case where the object recognition and holding apparatus 2000 is applied to a robot system in which recognition and holding operations for a target object by a robot are performed will be described according to the present exemplary embodiment.

The information processing apparatus 120 generates learning data (images to which labels are assigned) on the basis of captured images obtained by imaging a target object set as a target of imaging and holding by a manipulator 400 from a plurality of predetermined imaging positions and orientations. The robot system 2000 performs machine learning on a model by using the learning data generated by the information processing apparatus 120 and recognizes the target object in the image by using the learnt model to perform the holding operation. According to the present exemplary embodiment, the robot system 2000 learns the model on the basis of a convolutional neural network (CNN) corresponding to a type of deep learning. The robot system 2000 then recognizes the target object in the image by using the learnt leaning model (CNN model) and obtains holding position and orientation of the target object to perform the holding operation.

According to the present exemplary embodiment, the information processing apparatus 120 actually performs the holding operation once with respect to the target object. The information processing apparatus 120 also obtains the holding position and orientation of the manipulator 400 (holding position and orientation at the time of the holding operation) when the holding of the target object is actually performed and a holding success or failure result (holding success or failure information) indicating success/failure of the holding of the target object in the holding position and orientation as learning information. The information processing apparatus 120 then generates the learning data on the basis of the obtained learning information.

According to the present exemplary embodiment, the information processing apparatus 120 obtains the image in which the target object is imaged in the predetermined imaging position and orientation and associates the learning information with the obtained image to generate the learning data. At this time, the information processing apparatus 120 associates the above-described holding position and orientation in the relevant image and the holding success or failure information with the obtained image on the basis of the imaging position and orientation of the manipulator 400 at the time of the capturing of the obtained image and the holding position and orientation obtained as the learning information. Herein, the holding position and orientation in the above-described image are the actual holding position and orientation as viewed from the imaging position and orientation of the image. That is, the holding position and orientation in the above-described image are relative position and orientation information between the position and orientation of the manipulator 400 at the time of the capturing of the image and the position and orientation of the manipulator 400 when the holding of the above-described target object is actually performed.

The learning information is information used for the generation of the learning data and is information associated with the image. According to the present exemplary embodiment, the learning information includes the holding position and orientation at the time of the holding operation and the holding success or failure information. The learning data is a pair of the image used for the learning and the label. The label is the training signal used for the learning and includes the holding position and orientation and the holding success or failure information in the image.

In addition, the holding position and orientation are the position and orientation of the manipulator 400 when the target object is held. For example, in a case where a holding apparatus 600 sucks the target object by a suction mechanism, the holding position and orientation refer to the position and orientation of the manipulator 400 in a state in which a suction pad is in contact with the target object. Herein, the holding refers to a manipulation for gripping or sucking the target object to establish a state in which the target object can be conveyed thereafter. It should be noted that, in a case where a positional relationship between the manipulator 400 and the holding apparatus 600 is already found, the position and orientation of the holding apparatus 600 when the target object is held may be used as the holding position and orientation.

The imaging position and orientation are the position and orientation of the manipulator 400 at the time of the capturing of the image of the target object. It should be noted that, in a case where a positional relationship between the manipulator 400 and an imaging apparatus 500 is already found, the position and orientation of the imaging apparatus 500 at the time of the capturing of the image may be used as the imaging position and orientation. The above-described image includes at least one of a color image based on RGB, a depth image (range image), and a monochrome image.

System Configuration

As illustrated in FIG. 1, the robot system 2000 includes the information processing apparatus 120, a learning apparatus 220, a recognition apparatus 320, the manipulator 400, the imaging apparatus 500, a light source 510, and the holding apparatus 600.

The information processing apparatus 120 outputs a control value to the manipulator 400 to control the manipulator 400. The manipulator 400 is configured so as to be able to move the imaging apparatus 500, the light source 510, and the holding apparatus 600 such that a target object 1 is imaged from arbitrary position and orientation and that the target object 1 is manipulated. The information processing apparatus 120 also outputs an imaging trigger (imaging instruction) to the imaging apparatus 500 and can obtain the image captured by the imaging apparatus 500 that has received the imaging trigger. The information processing apparatus 120 uses the image obtained from the imaging apparatus 500 for the generation of the learning data.

The imaging apparatus 500 can capture a color image and a depth image of the target object. The imaging apparatus 500 performs the imaging at a timing when the imaging trigger from the information processing apparatus 120 is received and transmits an image signal to the information processing apparatus 120. The imaging apparatus 500 also performs the imaging at a timing when an imaging trigger from the recognition apparatus 320 which will be described below is received and transmits an image signal to the recognition apparatus 320.

The learning apparatus 220 learns and saves the learning model (CNN model) by using the learning data generated by the information processing apparatus 120. The recognition apparatus 320 outputs the imaging trigger to the imaging apparatus 500 and can obtain the image captured by the imaging apparatus 500 that has received the imaging trigger. The recognition apparatus 320 uses the image obtained from the imaging apparatus 500 for the manipulation of the target object. The recognition apparatus 320 recognizes the target object in the image and performs the manipulation by using the learning model saved by the learning apparatus 220 and the image obtained from the imaging apparatus 500.

The manipulator 400 can be structured, for example, by a multi-joint robot or the like. The manipulator 400 includes a position and orientation changing mechanism that can change the positions and orientations of the imaging apparatus 500, the holding apparatus 600, and the light source 510 by changing angles of respective joints. The position and orientation changing mechanism may be driven by an electrically-operated motor or may also be driven by an actuator actuated by a fluid pressure such as an oil pressure or an air pressure. This position and orientation changing mechanism is driven in accordance with operation instruction information output from the information processing apparatus 120.

The holding apparatus 600 is a tool for the robot to realize a manipulation in accordance with a type of the target object. The holding apparatus 600 can use a hand including a chuck mechanism that can be driven by the motor and capable of gripping the target object or a hand using a suction pad that sucks the target object by the air pressure. It should be noted that the holding apparatus 600 is detachably attached to the manipulator 400 and may be replaceable in accordance with a type of work. In addition, the manipulator 400 is not limited to the multi-joint robot and may be a numerical control (NC)-compatible movable machine. The imaging apparatus 500 and the light source 510 can be installed in the vicinity of the holding apparatus 600. The robot system 2000 executes an action determined by the information processing apparatus 120 and executes imaging of the target object 1 and a peripheral object 2 or a manipulation for holding and conveying the target object 1. According to the present exemplary embodiment, the action refers to a movement of the robot system 2000 for imaging or manipulating the target object 1.

The target object 1 is a part supposed to be a manipulation target by the manipulator 400 such as a camera or an accessory. The peripheral object 2 exists in the vicinity of the target object 1. The peripheral object 2 refers to all objects other than the target object 1 which are located in the vicinity of the target object 1. For example, as illustrated in FIG. 1, the peripheral object 2 includes objects of the same type as the target object 1 which exist in the vicinity of the target object 1 and are placed in bulk and a container that accommodates the target object 1. In addition, the peripheral object 2 may include an object placed in the vicinity of the container that accommodates the target object 1.

The imaging apparatus 500 is a visual sensor constituted by a camera, a sensor configured to detect light, a photodiode, and the like. The imaging apparatus 500 captures images of the target object 1 and the peripheral object 2 and outputs the captured images to the information processing apparatus 120. The light source 510 is constituted by a projector, for example. When the light source 510 outputs visible light or emits infrared light from a laser light source, the light source 510 projects uniform irradiation light or pattern light to the target object 1 and the peripheral object 2. When the imaging apparatus 500 captures the images of the target object 1 and the peripheral object 2 irradiated with the light by the light source 510, it is possible to obtain a range image representing a distance between the target object 1 and the peripheral object 2 on the basis of principles of the trigonometrical survey.

It should be noted that the imaging apparatus 500 can also capture the images of the target object 1 and the peripheral object 2 in a state in which the light is not projected by the light source 510. As illustrated in FIG. 1, the imaging apparatus 500 and the light source 510 may be attached to the manipulator 400, fixed and arranged above an imaging target space, or attached to another work machinery. In addition, a plurality of imaging apparatuses 500 and a plurality of light sources 510 may be arranged.

Apparatus Configuration

Figure 2:
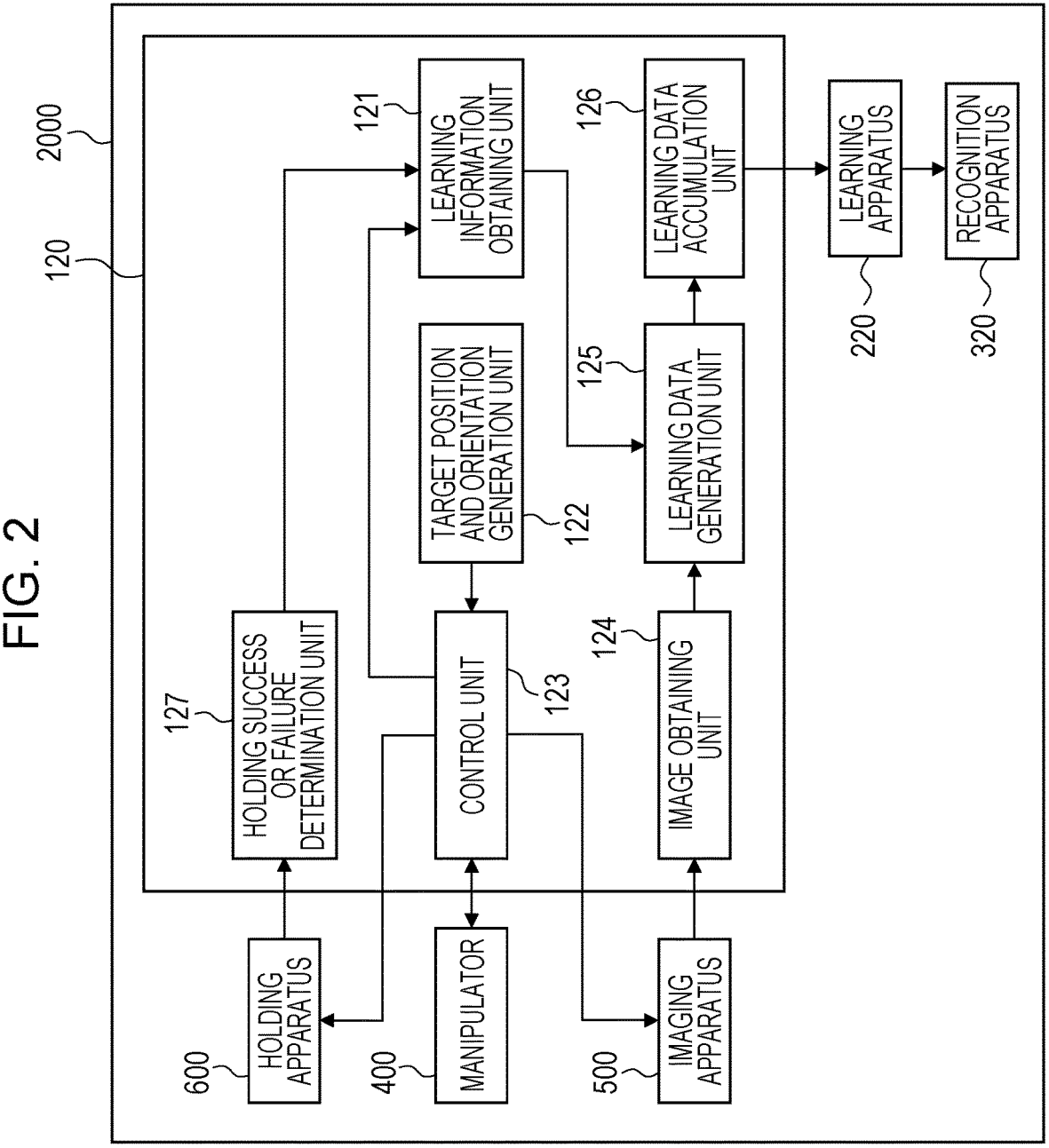
FIG. 2 illustrates a configuration of an information processing apparatus according to the first exemplary embodiment.

FIG. 2 illustrates a configuration of the robot system 2000 including the information processing apparatus 120 according to the present exemplary embodiment. The information processing apparatus 120 includes a learning information obtaining unit 121, a target position and orientation generation unit 122, a control unit 123, an image obtaining unit 124, a learning data generation unit 125, a learning data accumulation unit 126, and a holding success or failure determination unit 127.

The target position and orientation generation unit 122 generates a target position and orientation (target imaging position and orientation) of the manipulator 400 for the imaging by the imaging apparatus 500 and a target position and orientation (target holding position and orientation) of the manipulator 400 for the holding apparatus 600 to perform the holding. These target positions and orientations may be randomly generated or generated while a designer (user) previously specifies a range or a specific value. The target position and orientation generation unit 122 outputs the generated target positions and orientations to the control unit 123.

In a case where the imaging positions and orientations are input from the target position and orientation generation unit 122, the control unit 123 outputs the control value to the manipulator 400 such that the manipulator 400 is moved to the imaging position and orientation to move the imaging apparatus 500. Subsequently, when the manipulator 400 is moved to the instructed imaging position and orientation, the control unit 123 outputs the imaging trigger to the imaging apparatus 500. In a case where the holding position and orientation are input from the target position and orientation generation unit 122, the control unit 123 outputs the control value to the manipulator 400 so as to move the manipulator 400 moved to the holding position and orientation, so that the holding apparatus 600 is moved. Subsequently, when the manipulator 400 is moved to the instructed holding position and orientation, the control unit 123 outputs a holding trigger (holding instruction) to the holding apparatus 600. Furthermore, the control unit 123 can obtain information indicating the position and orientation of the manipulator 400 from the manipulator 400.

The image obtaining unit 124 obtains the image from the imaging apparatus 500 and outputs the obtained image to the learning data generation unit 125. The image obtaining unit 124 can be constituted by a capture board or a memory (RAM), for example. The holding success or failure determination unit 127 determines whether the holding succeeds or fails when the holding apparatus 600 performs the holding operation of the target object 1. For example, in a case where the holding apparatus 600 is the suction mechanism, the above-described determination can be performed by measuring a vacuum achieving degree at the time of the suction. Specifically, a threshold of the vacuum achieving degree at which the suction success is realized is previously set. The vacuum achieving degree is measured at the time of the execution of the suction operation. When the vacuum achieving degree reaches the threshold, the suction success is determined since the suction can be performed. When the vacuum achieving degree does not reach the threshold, the suction failure is determined since the suction is not performed.

The learning information obtaining unit 121 obtains the imaging position and orientation obtained by the control unit 123 from the manipulator 400 at the time of the imaging by the imaging apparatus 500 and the holding position and orientation obtained by the control unit 123 from the manipulator 400 at the time of the holding operation by the holding apparatus 600. The learning information obtaining unit 121 also obtains the holding success or failure information corresponding to the determination result of the holding success or failure determination unit 127. Subsequently, the learning information obtaining unit 121 outputs the obtained holding position and orientation at the time of the holding operation and the holding success or failure information to the learning data generation unit 125 as the learning information. The learning information obtaining unit 121 also outputs the obtained imaging position and orientation to the learning data generation unit 125 as information used for the generation of the learning data.

The learning data generation unit 125 associates the learning information input from the learning information obtaining unit 121 with the image input from the image obtaining unit 124 on the basis of the imaging position and orientation input from the learning information obtaining unit 121. At this time, the learning data generation unit 125 converts the holding position and orientation obtained as the learning information at the time of the holding operation into the holding position and orientation in the image on the basis of the imaging position and orientation of the image to be associated with this image. Subsequently, the learning data generation unit 125 generates the learning data on the basis of the image and the learning information (the holding position and orientation and the holding success or failure information) associated with this image and outputs the generated learning data to the learning data accumulation unit 126. The learning data accumulation unit 126 saves the learning data input from the learning data generation unit 125. The learning data accumulation unit 126 saves the learning data in a storage medium such as a memory.

It should be noted that the case has been described where the information processing apparatus 120, the learning apparatus 220, and the recognition apparatus 320 are separate apparatuses according to the present exemplary embodiment, but the information processing apparatus 120 may also include functions of the learning apparatus 220 and the recognition apparatus 320.

Figure 3:
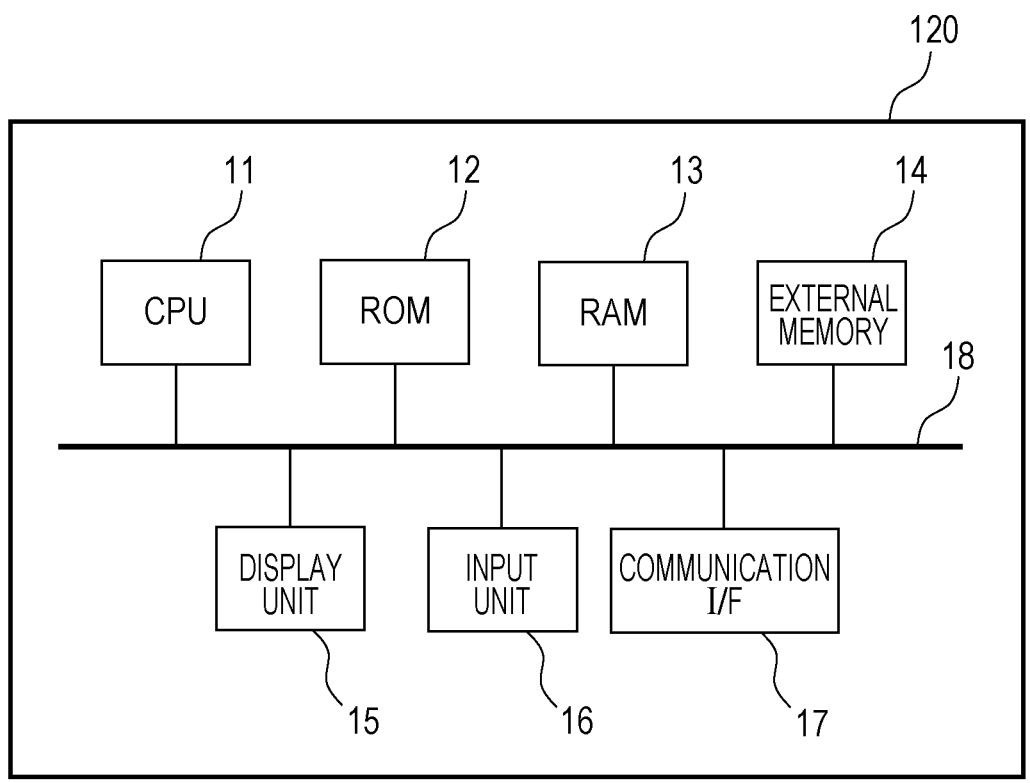
FIG. 3 illustrates an example of a hardware configuration of the information processing apparatus.

FIG. 3 illustrates an example of hardware configuration of the information processing apparatus 120.

The information processing apparatus 120 includes a central processing unit (CPU) 11, a read-only memory (ROM) 12, a random access memory (RAM) 13, an external memory 14, a display unit 15, an input unit 16, a communication I/F 17, and a system bus 18.

The CPU 11 is configured to control the operations in the information processing apparatus 120 in an overall manner. The CPU 11 controls the respective components (12 to 17) via the system bus 18. The ROM 12 is a non-volatile memory that stores the control program and the like used for the CPU 11 to execute the processing. It should be noted that this program may also be stored in the external memory 14 or a detachable storage medium (not illustrated). The RAM 13 functions as a main memory of the CPU 11, a work area, or the like. That is, the CPU 11 loads the necessary program and the like from the ROM 12 onto the RAM 13 when the execution of the processing is performed and executes this program and the like to realize various types of function operations.

The external memory 14 can store various data and various information used for the CPU 11 to perform the processing using the program. The external memory 14 can also store various data, various information, and the like obtained when the CPU 11 performs the processing using the program. The external memory 14 may also save the above-described learning data.

The display unit 15 is constituted by a monitor such as a liquid crystal display (LCD). The input unit 16 is constituted by a keyboard or a pointing device such as a mouse and configured such that the user of the information processing apparatus 120 can issue an instruction to the information processing apparatus 120. The communication I/F 17 is an interface for establishing a communication with external apparatuses (according to the present exemplary embodiment, the learning apparatus 220, the manipulator 400, the imaging apparatus 500, and the holding apparatus 600). A LAN interface can be used as the communication I/F 17, for example. The system bus 18 connects the CPU 11, the ROM 12, the RAM 13, the external memory 14, the display unit 15, the input unit 16, and the communication I/F 17 so as to be communicable with one another.

The functions of the respective units of the information processing apparatus 120 illustrated in FIG. 2 can be realized when the CPU 11 executes the program. It should be noted however that at least part of the respective units of the information processing apparatus 120 illustrated in FIG. 2 may be operated as dedicated-use hardware. In this case, the dedicated-use hardware is operated on the basis of the control of the CPU 11.

Recognition Processing

Figure 4:
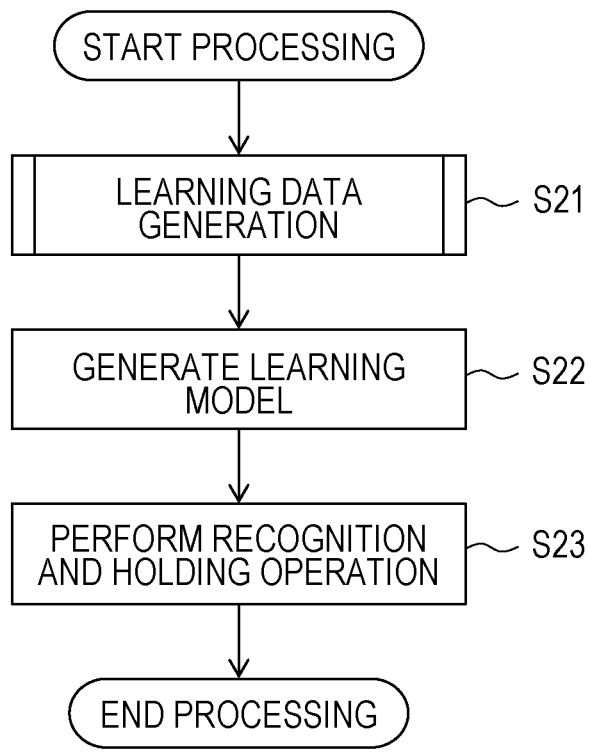
FIG. 4 is a flow chart illustrating processing by the robot system.

Hereinafter, an operation of the robot system 2000 will be described with reference to FIG. 4. This processing of FIG. 4 is started when an operator activates the robot system 2000, for example. It should be noted however that a timing for starting the processing is not limited to a time when the robot system 2000 is activated. Hereinafter, an alphabet "S" refers to a step in a flow chart.

First, in S21, the information processing apparatus 120 generates and saves learning data. A detail of learning data generation processing will be described below. When the information processing apparatus 120 completes the generation of the learning data, the flow shifts to S22. In S22, the learning apparatus 220 performs the learning of the learning model by using the learning data saved by the information processing apparatus 120 and saves the learning model. When this learning model is used, it is possible to obtain the position and orientation of the manipulator 400 for holding the target object in the image 1 while the image in which the target object 1 is imaged as an input. That is, it is possible to obtain information indicating how likely the holding of the target object 1 succeeds in which position and orientation.

In S23, the recognition apparatus 320 obtains the image from the imaging apparatus 500 and recognizes the target object in the image 1 by using the learning model saved in the learning apparatus 220. The imaging position and orientation of the image input at this time may be randomly generated or may also be generated while a designer (user) previously specifies a range or specifies a specific value. In addition, the imaging position and orientation may be generated by a method other than the above-described methods. The recognition apparatus 320 generates the recognized target object 1 for holding the holding position and orientation by using the learning model saved in the learning apparatus 220 on the basis of the above-described recognition result. Subsequently, the recognition apparatus 320 controls the manipulator 400 such that the manipulator 400 is moved to the generated holding position and orientation to move the holding apparatus 600. When the manipulator 400 is moved to the specified holding position and orientation, the recognition apparatus 320 outputs the holding trigger to the holding apparatus 600 to execute the holding operation of the target object 1 by the holding apparatus 600.

Learning Data Generation Processing

Figure 5:
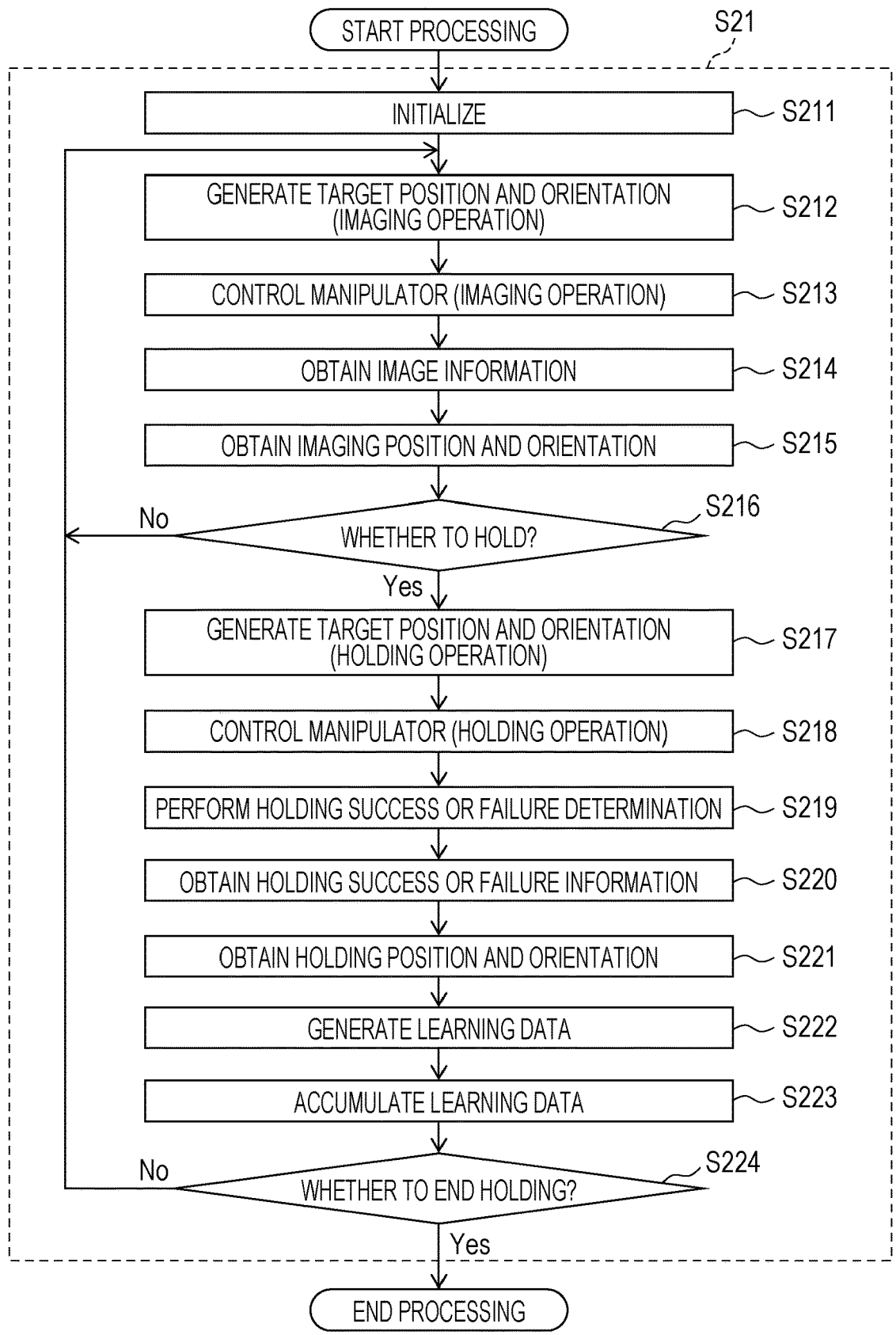
FIG. 5 is a flow chart illustrating processing by the information processing apparatus.

FIG. 5 is a flow chart illustrating a procedure of the learning data generation processing executed by the information processing apparatus 120 in S21 in FIG. 4. The information processing apparatus 120 can realize the processing illustrated in FIG. 5 when the CPU 11 reads out and executes the necessary program. It should be noted however that, as described above, at least part of the respective elements in the information processing apparatus 120 illustrated in FIG. 2 may be operated as the dedicated-use hardware to realize the processing of FIG. 5. In this case, the dedicated-use hardware is operated on the basis of the control of the CPU 11 of the information processing apparatus 120.

First, in S211, the information processing apparatus 120 performs initialization processing of the system. That is, the CPU 11 loads the program stored in the ROM 12 or the external memory 14 and develops the program onto the RAM 13 to establish an executable state. In addition, reading of parameters of the respective devices connected to the information processing apparatus 120 and returning to initial positions are performed to establish a usable state. Next, in S212, the target position and orientation generation unit 122 generates the target imaging position and orientation corresponding to the target position and orientation of the manipulator 400 for the imaging to be output to the control unit 123. Herein, the target imaging position and orientation may be decided by random numbers or may be previously determined by the fixed value by the designer (user). The target holding position and orientation may also be decided by specifying a range and using a random number within the range or may be generated by a method other than the above-described methods. For example, in a case where the objects including the target object 1 are placed in bulk as illustrated in FIG. 1, the imaging position and orientation may be randomly generated which are located in a hemispherical manner while a predetermined position in the area where the objects are placed in bulk is set as a center, and a position in the vicinity of the predetermined position is set as a fixation point.

In S213, the control unit 123 controls the manipulator 400 and moves the manipulator 400 to the imaging position and orientation generated in S212. Specifically, to move the manipulator 400 to the imaging position and orientation generated in S212, the control unit 123 decides how to move the manipulator 400. For example, the information of the target imaging position and orientation is converted into joint angle information of the manipulator 400 by forward kinematics, and command values for operating actuators of the respective joints of the manipulator 400 are calculated and output to a robot controller that controls the above-described actuators. As a result, the manipulator 400 is moved, and the imaging apparatus 500 takes the position and orientation at the time of the imaging.

In S214, the control unit 123 outputs the imaging trigger to the imaging apparatus 500, and the image obtaining unit 124 obtains the image from the imaging apparatus 500. Subsequently, the image obtaining unit 124 outputs the obtained image to the learning data generation unit 125.

In S215, the learning information obtaining unit 121 obtains the position and orientation of the manipulator 400 when the imaging apparatus 500 performs the imaging in S214 as the imaging position and orientation at the time of the imaging to be output to the learning data generation unit 125. For example, the learning information obtaining unit 121 obtains angle information of the respective joints at the time of the imaging from encoders located at the respective joints of the manipulator 400 and calculates the position and orientation of the manipulator 400 by inverse kinematics. Thus, the learning information obtaining unit 121 can obtain the imaging position and orientation.

In S216, the information processing apparatus 120 determines whether the flow shifts to the holding operation of the target object 1 or the imaging is continued. The information processing apparatus 120 can previously set the number of times to perform the imaging, for example, and in a case where the imaging is performed the set number of times, it can be determined that the flow shifts to the holding operation of the target object 1. It should be noted that the information processing apparatus 120 may determine that the flow shifts to the holding operation of the target object 1 when the imaging in the specified range is performed at predetermined intervals and the imaging in the specified range is completed. In addition, other determination methods may be used. In a case where it is determined that the imaging is continued, the information processing apparatus 120 returns to S212. In a case where it is determined that the flow shifts to the holding operation of the target object 1, the information processing apparatus 120 shifts to S217.

In S217, the target position and orientation generation unit 122 generates the target holding position and orientation corresponding to the target position and orientation of the manipulator 400 for the holding to be output to the control unit 123. Herein, the target holding position and orientation may be decided by random numbers or may be previously determined by the fixed value by the designer (user). The target holding position and orientation may also be decided by specifying a range and using a random number within the range or may be generated by a method other than the above-described methods.

For example, in a case where the target object 1 is stacked flat, the position and orientation of the target object 1 may be estimated by a background difference by using the image captured by the imaging apparatus 500 to decide its centroid position as a suction position, and a height of the suction position may be obtained from the range image to generate the target holding position and orientation. On the other hand, in a case where the target object 1 is placed in bulk, a plane surface may be detected by the image captured by the imaging apparatus 500, and the target holding position and orientation may be generated such that a position having the closest distance on the plane surface is sucked. In a case where the suction position of the target object 1 is already learnt, the target holding position and orientation may be generated by referring to the generated learning model. Furthermore, the target object 1 may be recognized, and the target holding position and orientation may be generated by a method other than the above-described methods.

In S218, the control unit 123 controls the manipulator 400 to execute the holding operation. Specifically, to move the manipulator 400 to the holding position and orientation generated in S217, the control unit 123 decides how to move the manipulator 400. The decision method is similar to the decision method in S213. When the manipulator 400 is moved to the target holding position and orientation and the holding apparatus 600 is moved to the position and orientation at the time of the holding operation, the control unit 123 outputs the holding trigger to the holding apparatus 600 and causes the holding apparatus 600 to perform the holding operation. For example, in a case where the holding apparatus 600 is the suction apparatus, the holding apparatus 600 executes the suction operation and performs the operation for sucking the target object 1. In a case where the holding apparatus 600 is the gripping apparatus, the holding apparatus 600 executes the gripping operation and performs the operation for gripping the target object 1.

In S219, the holding success or failure determination unit 127 performs holding success or failure determination. For example, in a case where the holding apparatus 600 attached to the manipulator 400 is the suction apparatus, the holding success or failure determination unit 127 performs the holding success or failure determination by evaluating a vacuum achieving degree of an ejector when the holding apparatus 600 performs the suction operation. Specifically, the holding success or failure determination unit 127 previously sets a threshold of the vacuum achieving degree at which the suction success is determined and measures the vacuum achieving degree at the time of the suction operation. When the vacuum achieving degree reaches the threshold, the suction success is determined since the suction can be performed. When the vacuum achieving degree does not reach the threshold, the suction failure is determined since the suction is not realized.

On the other hand, in a case where the holding apparatus 600 is the gripping apparatus, the holding success or failure determination unit 127 performs the holding success or failure determination by evaluating a gripping width. Specifically, the holding success or failure determination unit 127 measures the gripping width at the time of the execution of the holding operation. When the gripping width is matched with a size of the target object 1, the holding success is determined. In a case where the gripping width is too narrow or too open, since there is a possibility that nothing is held, an object different from the target object is held, or the holding is performed in an unintended state, the holding failure is determined. In this manner, the holding success or failure determination unit 127 determines the holding success or failure and outputs the result to the learning information obtaining unit 121 as the holding success or failure information.

In S220, the learning information obtaining unit 121 obtains the holding success or failure information output by the holding success or failure determination unit 127 in S219 as the learning information and outputs the holding success or failure information to the learning data generation unit 125. In S221, the learning information obtaining unit 121 obtains the position and orientation of the manipulator 400 when the holding apparatus 600 performs the holding operation in S218 as the holding position and orientation at the time of the holding operation and outputs the position and orientation to the learning data generation unit 125 as the learning information. In this manner, the learning information obtaining unit 121 obtains the position and orientation of the manipulator 400 when the control unit 123 outputs the holding trigger to the holding apparatus 600 as the holding position and orientation at the time of the holding operation. Therefore, even in a case where the manipulator 400 performs the holding operation by the holding apparatus 600 in a position deviated from the target holding position and orientation for any reason, the position and orientation of the manipulator 400 when the holding operation is actually performed can be appropriately obtained.

In S222, the learning data generation unit 125 associates the learning information obtained from the learning information obtaining unit 121 in S220 and S221 with the image obtained from the image obtaining unit 124 in S214 and generates the learning data. Subsequently, the learning data generation unit 125 outputs the generated learning data to the learning data accumulation unit 126. Hereinafter, the method of generating the learning data will be specifically described.

The holding position and orientation of the manipulator 400 at the time of the holding operation and the holding success or failure information are input as the learning information. When these pieces of learning information are associated with the image, the learning data is generated and accumulated. The holding position and orientation associated with the image at this time are the holding position and orientation in this image and are obtained by converting the holding position and orientation at the time of the holding operation obtained as the learning information into relative holding position and orientation as viewed from the imaging position and orientation on the basis of the imaging position and orientation.

Figure 6:
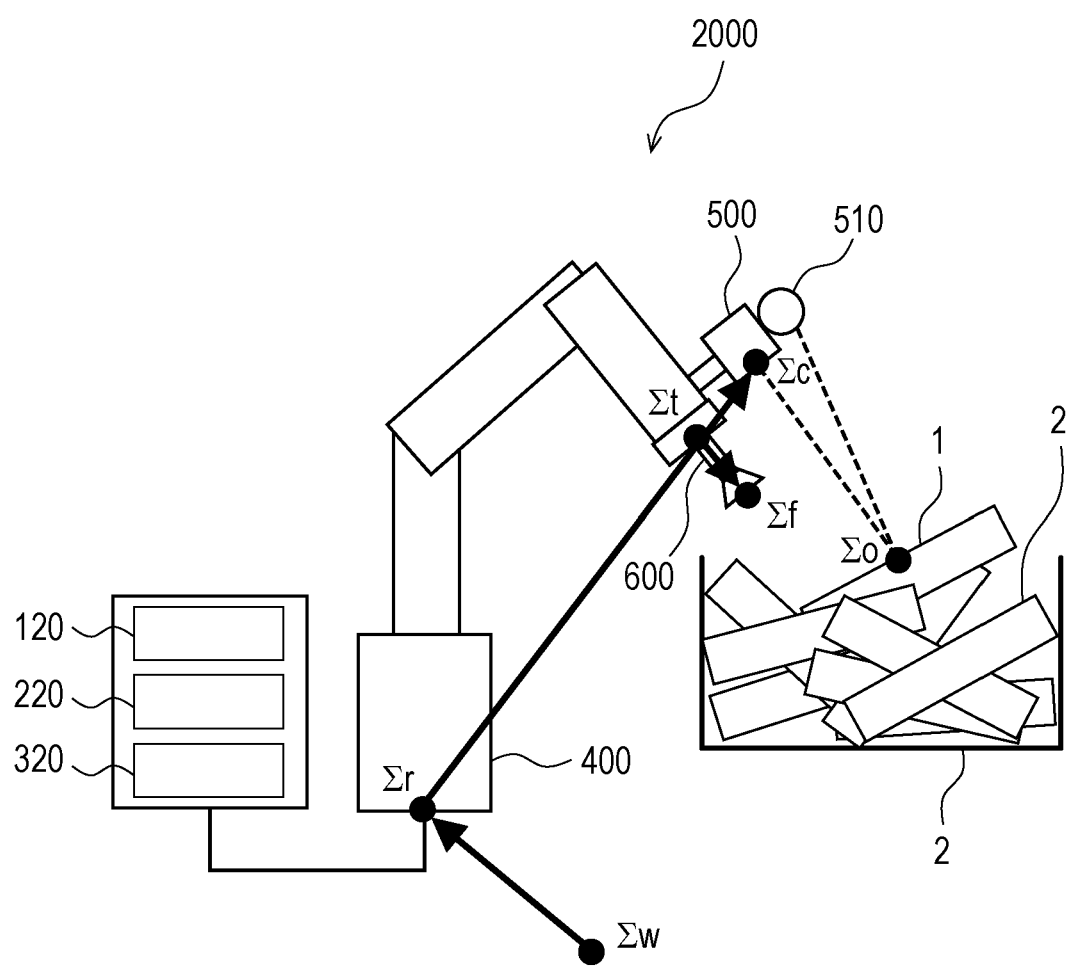
FIG. 6 is an explanatory diagram for describing a coordinate system of the robot system.

According to the present exemplary embodiment, respective coordinate systems are set as illustrated in FIG. 6 at the time of the generation of the learning data. That is, a coordinate system of the imaging apparatus 500 is set as $\Sigma c$, a coordinate system of the manipulator 400 is set as $\Sigma r$, leading end a coordinate system of the manipulator 400 is set as $\Sigma t$, a coordinate system of the holding apparatus 600 is set as $\Sigma f$, and a world coordinate system $\Sigma w$ is set as a coordinate system corresponding to a reference in a working space. A displacement from the world coordinate system $\Sigma w$ to the manipulator coordinate system $\Sigma r$ is set as (RX, RY, RZ), and a 3×3 rotating matrix representing the orientation of the manipulator 400 is set as RM.

In addition, a displacement from the manipulator coordinate system $\Sigma r$ to the leading end coordinate system $\Sigma t$ of the manipulator 400 is set as (TX, TY, TZ), and a 3×3 rotating matrix representing the orientation of the leading end of the manipulator 400 is set as TM. Furthermore, a displacement from the leading end coordinate system $\Sigma t$ to the holding apparatus coordinate system $\Sigma f$ is set as (FX, FY, FZ), and a 3×3 rotating matrix representing the orientation of the leading end of the holding apparatus 600 is set as FM. It should be noted that the leading end of the holding apparatus 600 is a part where the holding apparatus 600 contacts the target object 1 or the peripheral object 2.

Moreover, a displacement from the manipulator coordinate system $\Sigma r$ to the imaging apparatus coordinate system $\Sigma c$ is set as (CX, CY, CZ), and a 3×3 rotating matrix representing the orientation of the imaging apparatus 500 is set as CM. Furthermore, a displacement from the imaging apparatus coordinate system $\Sigma c$ to the target object coordinate system $\Sigma o$ is set as (OX, OY, OZ), and a 3×3 rotating matrix representing the orientation of the target object 1 is set as OM. In addition, a displacement of the target object 1 as viewed from the world coordinate system $\Sigma w$ is set as (WX, WY, WZ), and a 3×3 rotating matrix representing the orientation is set as WM.

When the holding apparatus 600 attached to the leading end of the manipulator 400 is in contact with the target object 1, the position of the leading end of the holding apparatus 600 attached to the leading end of the manipulator 400 is matched with the position of the target object 1 imaged by the imaging apparatus 500. Therefore, when the leading end of the holding apparatus 600 is in contact with the target object 1, the following expressions (1) and (2) are established.

$$\begin{pmatrix} & & & WX \\ & WM & & WY \\ & & & WZ \\ 0 & 0 & 0 & 1 \end{pmatrix} = \begin{pmatrix} & & & RX \\ & RM & & RY \\ & & & RZ \\ 0 & 0 & 0 & 1 \end{pmatrix} \cdot \begin{pmatrix} & & & TX \\ & TM & & TY \\ & & & TZ \\ 0 & 0 & 0 & 1 \end{pmatrix} \cdot \begin{pmatrix} & & & FX \\ & FM & & FY \\ & & & FZ \\ 0 & 0 & 0 & 1 \end{pmatrix} \quad (1)$$

$$\begin{pmatrix} & & & WX \\ WM & & & WY \\ & & & WZ \\ 0 & 0 & 0 & 1 \end{pmatrix} = \qquad (2)$$

$$\begin{pmatrix} & & & RX \\ RM & & & RY \\ & & & RZ \\ 0 & 0 & 0 & 1 \end{pmatrix} \cdot \begin{pmatrix} & & & CX \\ CM & & & CY \\ & & & CZ \\ 0 & 0 & 0 & 1 \end{pmatrix} \cdot \begin{pmatrix} & & & OX \\ OM & & & OY \\ & & & OZ \\ 0 & 0 & 0 & 1 \end{pmatrix}$$

From the above-described expressions (1) and (2), it is possible to obtain the position and orientation of the manipulator 400 by the imaging apparatus 500 when the holding apparatus 600 holds the target object 1 in the image in which the target object 1 is imaged. For this reason, it is possible to find out how the manipulator 400 is to be controlled such that the holding apparatus 600 is moved to the position of the target object 1 as viewed from the imaging apparatus coordinate system Σc on a basis of a relationship among the imaging apparatus coordinate system Σc, the target object coordinate system Σo, the leading end coordinate system Σt, and the holding apparatus coordinate system Σf. Since this state is established in arbitrary imaging position and orientation, it is possible to obtain the position and orientation of the manipulator 400 when the holding apparatus 600 holds the target object 1 with respect to each of the plurality of images captured in the plurality of predetermined imaging positions and orientations.

It should be noted that, according to the present exemplary embodiment, the imaging apparatus 500 and the holding apparatus 600 are installed in the same manipulator 400, but the present exemplary embodiment can also be applied to a case where a manipulator that can move the imaging apparatus 500 and a manipulator that can move the holding apparatus 600 are different from each other.

As described above, the learning data is data constituted by a pair of the image and the label used for the learning. The plural pieces of learning data exist so as to correspond to the plurality of images captured in the plurality of different imaging positions and orientations. The label is the training signal used for the learning and includes the holding position and orientation and the holding success or failure information in each of the images. That is, the learning data generation unit 125 generates information indicating position and orientation in each of the images in which the holding of the target object 1 is performed and information indicating whether the holding succeeds or fails as the learning data with respect to each of the plurality of images.

Descriptions will be provided with reference to FIG. 5 again. In S223, the learning data accumulation unit 126 saves the learning data generated in S222. In S224, the information processing apparatus 120 determines whether the holding operation of the target object 1 is ended or continued. The information processing apparatus 120 previously sets the number of times to perform the holding, for example, and in a case where the holding is performed the set number of times, it is possible to determine that the holding operation is ended. It should be noted that the information processing apparatus 120 may perform the holding operation in the target holding positions and orientations set at previously determined intervals in the specified range and determine that the holding operation is ended when the holding operation is performed in all the holding positions and orientations. In addition, other determination methods may be used. The information processing apparatus 120 returns to S212 in a case where it is determined that the holding operation continues. The information processing apparatus 120 ends the learning data generation processing in a case where it is determined that the holding operation is ended.

As described above, the information processing apparatus 120 according to the present exemplary embodiment obtains the information including the holding position and orientation for performing the holding of the target object 1 and the holding success or failure information in the holding position and orientation as the learning information used for the generation of the learning data with regard to the target object 1 set as the manipulation target. At this time, the information processing apparatus 120 decides the target holding position and orientation for performing the holding of the target object 1. Then, the information processing apparatus 120 controls the manipulator 400 to move the holding apparatus 600 to the decided holding position and orientation and instructs the holding apparatus 600 to perform the holding. Subsequently, the information processing apparatus 120 obtains the holding position and orientation when the holding apparatus 600 performs the holding operation and also determines the success or failure of the holding of the target object 1 by the holding apparatus 600 to obtain the holding success or failure information.

The information processing apparatus 120 also determines the predetermined imaging position and orientation for imaging the target object 1. Then, the information processing apparatus 120 controls the manipulator 400 to move the imaging apparatus 500 to the decided imaging position and orientation and instructs the imaging apparatus 500 to perform the imaging. Subsequently, the information processing apparatus 120 obtains the image in which the target object 1 is imaged in the above-described predetermined imaging position and orientation and generates the learning data on the basis of the obtained image and the learning information.

With this configuration, it is possible to generate the learning data by associating the result of the holding operation of the target object 1 set as the manipulation target with the image in which the target object 1 is imaged in the predetermined imaging position and orientation. For example, in a case where the plurality of imaging positions and orientations are decided, after the imaging is performed plural times, the holding operation of the target object 1 is performed once, and the result of the single holding operation is associated with each of the images captured in the plurality of different conditions. As a result, it is possible to generate the plural pieces of learning data. Therefore, the time for generating the learning data can be shortened. In addition, since it is possible to shorten the learning time, depletion of the manipulator 400 and the holding apparatus 600 can be reduced. Thus, it is possible to use the device for a still longer period of time, and the reduction in costs can be realized.

Herein, the learning data is an image to which a label is assigned. The label can be set as a pair of the relative position and orientation information between the imaging position and orientation at the time of the imaging of the target object 1 and the holding position and orientation at the time of the holding operation of the target object 1 and the holding success or failure information in the holding position and orientation at the time of the holding operation of the target object 1. That is, the information processing apparatus 120 converts the holding position and orientation when the holding operation is actually performed with respect to the target object 1 into the holding position and orientation in the captured image to be associated with the image. Herein, in a case where the plurality of images are captured in the plurality of different imaging conditions, the information processing apparatus 120 can convert the holding position and orientation when the holding operation is actually performed with respect to the target object 1 into the holding position and orientation in each of the plurality of images to be associates with the image. In this manner, it is possible to easily and appropriately associate the learning information obtained by the single holding operation with the plurality of images.

In this manner, according to the present exemplary embodiment, since the large amount of learning data for holding the target object 1 can be easily generated, the labor for generating the learning model for holding the target object 1 can be reduced.

Second Exemplary Embodiment

Next, a second exemplary embodiment of the present invention will be described.

According to the above-described first exemplary embodiment, the case has been described where the information processing apparatus 120 generates the learning data before the recognition and holding operations by the recognition apparatus 320. According to the second exemplary embodiment, a case will be described where the learning data is further generated during the recognition and holding operations by the recognition apparatus 320 (at runtime).
System Configuration The configuration of the robot system 2000 according to the present exemplary embodiment is similar to the configuration illustrated in FIG. 1.
Apparatus Configuration The configuration of the information processing apparatus 120 according to the present exemplary embodiment is similar to the configuration illustrated in FIG. 2. It should be noted however that, according to the present exemplary embodiment, the configuration of the recognition apparatus 320 is different from that of the first exemplary embodiment. The recognition apparatus 320 obtains the image from the imaging apparatus 500 and refers to the learning model saved in the learning apparatus 220 to recognize the target object in the image and generate the target position and orientation (target holding position and orientation) for holding the target object. Subsequently, the recognition apparatus 320 controls the manipulator 400 such that the manipulator 400 is moved to the generated target holding position and orientation and causes the holding apparatus 600 to perform the holding operation. According to the present exemplary embodiment, the recognition apparatus 320 also performs the imaging of the target object 1 and the peripheral object 2 plural times during the movement of the manipulator 400 until the holding apparatus 600 performs the holding operation and generates the learning data by using the captured images.

The configuration of the recognition apparatus 320 includes the configuration of the information processing apparatus 120 illustrated in FIG. 2 and the configuration of the learning apparatus 220. That is, the recognition apparatus 320 includes a generation function of the learning data and a generation function of the learning model. It should be noted however that the processings of the respective units equivalent to the target position and orientation generation unit 122, the control unit 123, and the image obtaining unit 124 of FIG. 2 in the recognition apparatus 320 are different from those of the information processing apparatus 120 according to the first exemplary embodiment in that the learning data generation processing at runtime is performed.
Recognition Processing The flow of the recognition processing by the robot system 2000 according to the present exemplary embodiment is similarly to that of FIG. 4. It should be noted however that the processing in S23 of FIG. 4 is different from the above-described first exemplary embodiment.

Figure 7:
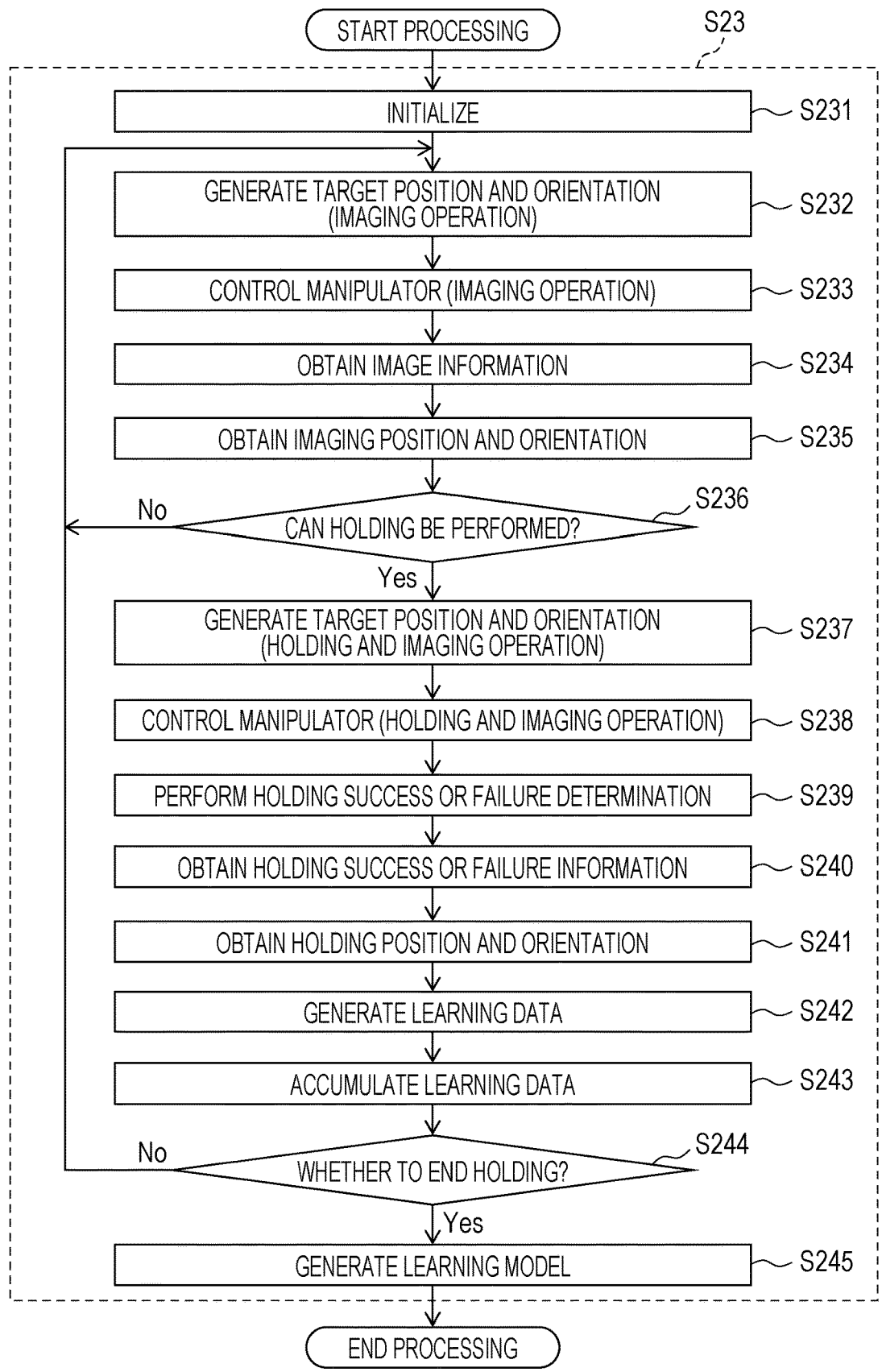
FIG. 7 is a flow chart illustrating processing by a recognition apparatus according to a second exemplary embodiment.

FIG. 7 is a flow chart illustrating a procedure of recognition and holding operation processing executed by the recognition apparatus 320 in S23 in FIG. 4. A hardware configuration of the recognition apparatus 320 is similar to the hardware configuration of the information processing apparatus 120 illustrated in FIG. 3. When the CPU of the recognition apparatus 320 reads out and executes the necessary program, it is possible to realize the processing illustrated in FIG. 7. It should be noted however that at least part of the respective elements in the recognition apparatus 320 may be operated as the dedicated-use hardware to realize the processing of FIG. 7. In this case, the dedicated-use hardware is operated on the basis of the control of the CPU 11 of the recognition apparatus 320.

The processing of FIG. 7 is processing relevant to S23 in FIG. 4 and is processing executed after the learning data generation in the information processing apparatus 120 and the learning model generation in the learning apparatus 220. According to the present exemplary embodiment, a case will be described where the recognition apparatus 320 refers to the learning model saved by the learning apparatus 220 in S22 and generates the target position and orientation (imaging and holding) used for the generation of the learning data. However, in a case where the recognition apparatus 320 generates the above-described target position and orientation by another method without using the learning model saved by the learning apparatus 220, the processing of FIG. 7 does not necessarily need to be performed after the processings in S21 and S22.

Herein, since the processings in S231 to S235 and S239 to S244 in FIG. 7 are similar to the processings in S211 to S215 and S219 to S224 in FIG. 5, aspects having different processing contents will be mainly described below.

In S236, the recognition apparatus 320 refers to the learning model of the learning apparatus 220 on the basis of the image obtained in S234 to recognize the target object in the image 1 and determines whether or not the recognized target object 1 can be held. Specifically, in a case where the recognition apparatus 320 does not generate the position and orientation in which the above-described recognized target object 1 can be held even by referring to the learning model of the learning apparatus 220, it is determined that the target object 1 is not held, and the flow returns to S232 to perform the imaging again. On the other hand, in a case where it is possible to generate the position and orientation in which the target object 1 can be held as a result of the reference to the learning model, it is determined that the target object 1 can be held, and the flow shifts to S237. It should be noted that the processings in S212 to S215 are performed plural times according to the above-described first exemplary embodiment, but the processings do not necessarily need to be performed plural times according to the present exemplary embodiment.

In S237, the recognition apparatus 320 generates the target position and orientation for the holding and imaging operations. According to the above-described first exemplary embodiment, only the generation of the target position and orientation for the holding is performed in S217. In contrast to this, according to the present exemplary embodiment, the imaging is also performed during the movement to the holding position and orientation for additionally generating the learning data. For this reason, the recognition apparatus 320 generates the plurality of target positions and orientations for the imaging during the movement to the holding position and orientation in addition to the target position and orientation for the holding.

At this time, a trajectory of the manipulator 400 may be generated such that the movement to the target holding position and orientation becomes a shortest distance or a shortest time, but the trajectory of the manipulator 400 may also be generated such that still more captured images can be obtained. For example, the trajectory may be decided in which the imaging can be performed in many positions and orientations while the target object 1 is set as the center, or the trajectory may also be decided by another method.

In S238, the recognition apparatus 320 controls the manipulator 400 for the holding and imaging operations. Specifically, the processing of moving the manipulator 400 towards the target holding position and orientation generated in S237 to perform the holding operation is executed. At this time, in a case where the trajectory up to the target holding position and orientation is decided in S237, the manipulator 400 is moved to the target holding position and orientation while passing through the trajectory. Subsequently, both the obtaining of the images in the plurality of imaging positions and orientations generated in S237 and the obtaining of the imaging position and orientation are performed during the movement of the manipulator 400 to the target holding position and orientation.

Figure 8:
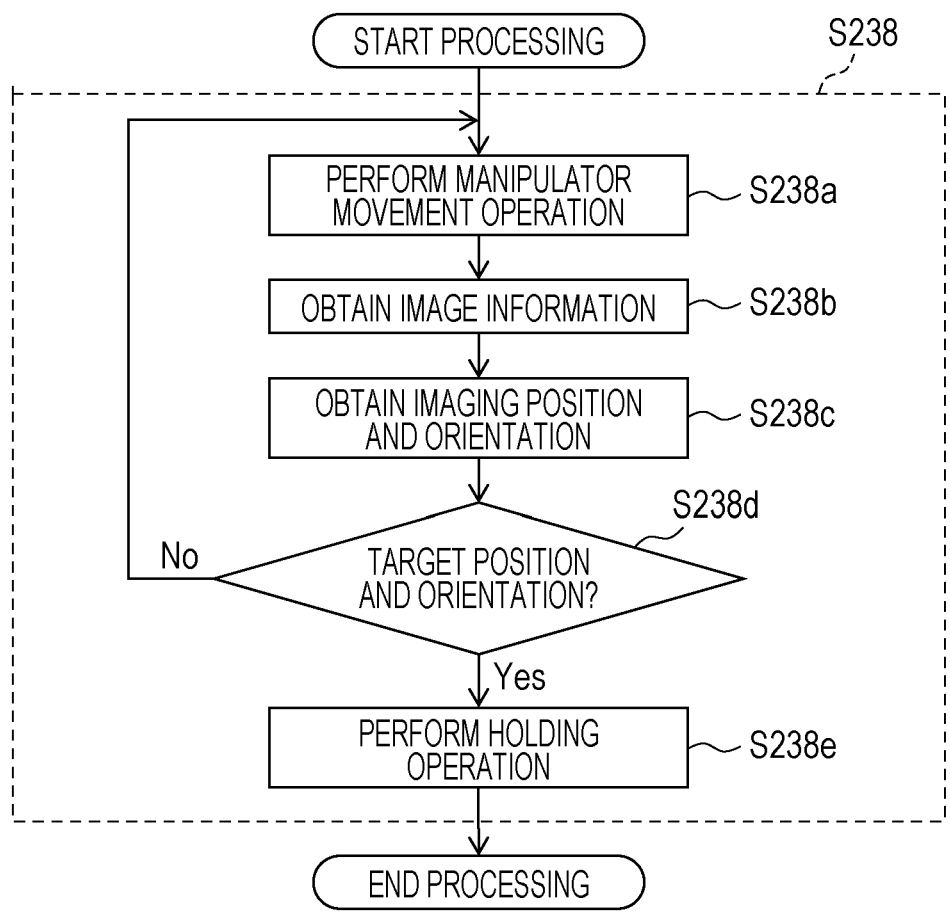
FIG. 8 is a flow chart illustrating processing of an operation for manipulator control according to the second exemplary embodiment.

FIG. 8 is a flow chart illustrating a detail of the manipulator control processing executed in S238 in FIG. 7.

In S238a, the recognition apparatus 320 selects one of the target positions and orientations generated in S237 in FIG. 7 and moves the manipulator 400 to the selected target position and orientation. It should be noted however that, at this time, the target holding position and orientation are lastly selected. In S238b, in a state in which the manipulator 400 is moved to the target position and orientation selected in S238a, the recognition apparatus 320 outputs the imaging trigger to the imaging apparatus 500 and obtains the image captured by the imaging apparatus 500 that has received the imaging trigger. In S238c, the recognition apparatus 320 obtains the imaging position and orientation of the image obtained in S238b.

In S238d, the recognition apparatus 320 determines whether or not the manipulator 400 reaches the target holding position and orientation. In a case where the manipulator 400 reaches the target holding position and orientation, the flow shifts to S238e, and the recognition apparatus 320 causes the holding apparatus 600 to perform the holding operation of the target object 1. On the other hand, the recognition apparatus 320 determines in S238d that the manipulator 400 does not reach the target holding position and orientation, the flow returns to S238a to continuously perform the manipulation movement operation. That is, the recognition apparatus 320 moves the manipulator 400 to the target position and orientation where the imaging operation is not performed among the target positions and orientations generated in S237 and performs the obtaining of the image and the obtaining of the imaging position and orientation. This processing is repeatedly performed until the manipulator 400 reaches the target holding position and orientation.

Descriptions will be provided with reference to FIG. 7 again. In S245, the recognition apparatus 320 performs the learning of the learning model by using the learning data accumulated in S213 and saves the learning model in the learning apparatus 220. The processing in S245 is similar to the processing in S22 in FIG. 4.

It should be noted that, in FIG. 7, the generation of the imaging position and orientation in S232 and the manipulator control for the imaging operation in S233 do not necessarily need to be executed in a case where the manipulator 400 is located in the position and orientation where the target object 1 can be imaged. In addition, the obtaining of the imaging position and orientation in S235 does not necessarily need to be executed since the imaging position and orientation are obtained in S238c in FIG. 8. Furthermore, according to the present exemplary embodiment, the case has been described where the imaging for the learning data generation is performed after the holding position and orientation are decided, but the imaging may also be performed before the holding position and orientation are decided, and the image used for the learning data generation may be obtained.

As described above, according to the present exemplary embodiment, the recognition apparatus 320 inputs the image in which the target object 1 is imaged and recognizes the target object in the image 1 described above on the basis of the model learnt by the learning apparatus 220 to decide the holding position and orientation for performing the holding of the recognized target object 1. Furthermore, the recognition apparatus 320 decides the imaging position and orientation for imaging the recognized target object 1 on the basis of the model learnt by the learning apparatus 220. Subsequently, the recognition apparatus 320 images the target object 1 in the decided imaging position and orientation to obtain the image while the manipulator 400 is moved to the decided holding position and orientation and also obtains the position and orientation of the manipulator 400 at the time of the imaging as needed. When the manipulator 400 is moved to the decided holding position and orientation, the recognition apparatus 320 instructs the holding apparatus 600 to perform the holding and obtains the position and orientation of the manipulator 400 and the holding success or failure information at this time as the learning information. Subsequently, the recognition apparatus 320 generates the learning data similarly as in the information processing apparatus 120.

In this manner, the recognition apparatus 320 can obtain the learning information used for the generation of the learning data and the image used for the learning at runtime when the recognition and the holding of the target object 1 are performed and generate the learning data. Therefore, it is possible to efficiently generate the learning data, and the time for generating the learning data can be shortened.

Third Exemplary Embodiment

Next, a third exemplary embodiment of the present invention will be described.

According to the first exemplary embodiment and the second exemplary embodiment described above, the case has been described where the holding position and orientation and the holding success or failure information are associated with the image to generate the learning data. According to the third exemplary embodiment, a case will be described where gravity direction information indicating a gravity direction in the image is further associated with the image to generate the learning data.

Apparatus Configuration

Figure 9:
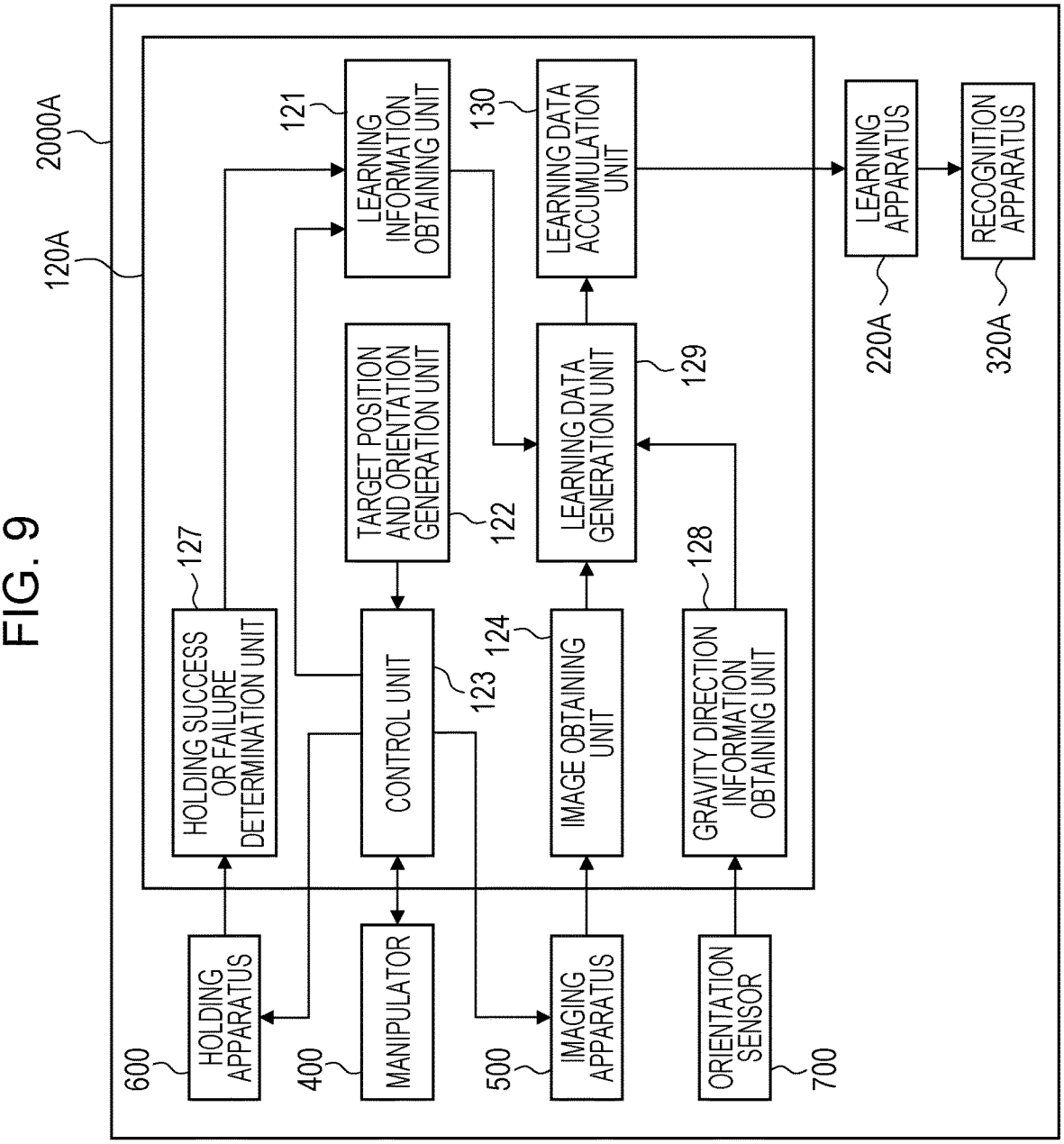
FIG. 9 illustrates a configuration of the information processing apparatus according to a third exemplary embodiment.

FIG. 9 is a block diagram illustrating a configuration of a robot system 2000A according to the present exemplary embodiment. In FIG. 9, the same reference sign is assigned to the part having the similar configuration as that in FIG. 2, and hereinafter, a part having a different configuration will be mainly described.

The robot system 2000A includes an information processing apparatus 120A. The information processing apparatus 120A includes a configuration of the information processing apparatus 120 illustrated in FIG. 2 to which a gravity direction information obtaining unit 128 is added. In addition, the learning data generation unit 125, the learning data accumulation unit 126, the learning apparatus 220, and the recognition apparatus 320 of FIG. 2 are replaced with a learning data generation unit 129, a learning data accumulation unit 130, a learning apparatus 220A, and a recognition apparatus 320A having different processing contents.

Moreover, the robot system 2000A is newly provided with an orientation sensor 700 configured to measure the orientation of the manipulator 400.

According to the present exemplary embodiment, a case where the orientation of the manipulator 400 may be changed will be described. The case where the orientation of the manipulator 400 may be changed refers to a case where the manipulator 400 is attached to a drone, a case where the manipulator 400 is used as part of an automatic guided vehicle (AGV), or the like.

According to the first exemplary embodiment and the second exemplary embodiment described above, the holding position and orientation and the holding success or failure information are associated with the image to generate the learning data. For this reason, only the relative position and orientation information between the manipulator 400 and the target object 1 is taken into account.

However, even when the target object 1 similarly appears on an image, it may be difficult to determine a situation as to whether the target object 1 is in contact with a wall as being imaged from the above or is placed on a floor as being imaged from the side on the basis of the image in some cases. The following differences may occur. When the target object 1 is imaged from the above, the target object 1 can be picked up from the above by suction. In a case where the target object 1 is imaged from the side, if the target object 1 is sucked from the side, the target object 1 may fall during conveyance, for example. In this manner, even when the similar situations seem to be established when determined on the basis of only the images, an appropriate picking method may differ due to different orientations.

In view of the above, according to the present exemplary embodiment, the orientation sensor 700 is used, and the learning data is generated by also associating the gravity direction information with the image. That is, not only the relative position and orientation information between the manipulator 400 and the target object 1 but also absolute position and orientation information are associated with the image to generate the learning data.

The orientation sensor 700 is constituted by a gyro sensor, an acceleration sensor, or the like and configured to measure the orientation of the manipulator 400 to output orientation information to the information processing apparatus 120A. The orientation sensor 700 is attached to a position where the orientation of the manipulator 400 can be measured. For example, the orientation sensor 700 can be attached to a base of the manipulator 400 or the leading end of the manipulator 400. In a case where the orientation sensor 700 is attached to the leading end of the manipulator 400, the coordinates may be converted into coordinates of the base of the manipulator 400 by using the position and orientation information of the manipulator 400. It should be noted that a configuration may also be adopted in which the orientation sensor 700 is not directly attached to the manipulator 400 as long as a position and orientation relationship with the manipulator 400 is uniquely obtained.

The gravity direction information obtaining unit 128 obtains a gravity direction while the orientation information measured by the orientation sensor 700 is set as an input and outputs the gravity direction information to the learning data generation unit 129. The gravity direction information obtaining unit 128 can be constituted by a memory (RAM), for example. The gravity direction information obtaining unit 128 obtains the gravity direction information in synchronism with the obtaining of the imaging position and orientation when the imaging apparatus 500 captures the image. Therefore, the gravity direction information obtaining unit 128 can obtain information indicating the gravity direction of the manipulator 400 when the imaging apparatus 500 captures the image.

Subsequently, the learning data generation unit 129 associates the holding position and orientation and the holding success or failure information with the image and also associates the gravity direction information in the image with the image at the same time. The learning data accumulation unit 130 accumulates the learning data constituted by the image, the gravity direction information of the image, the holding position and orientation in the image, and the holding success or failure information. In addition, the learning apparatus 220A uses the above-described learning data accumulated by the learning data accumulation unit 130 for the learning of the CNN model (learning model), and the recognition apparatus 320A uses the learning model saved in the learning apparatus 220A to perform the recognition and holding operations of the target object 1.

Recognition Processing

The flow of the recognition processing by the robot system 2000A according to the present exemplary embodiment is similar to that of FIG. 4. It should be noted however that the contents of the respective processings are different from those of the above-described first exemplary embodiment.

Figure 10:
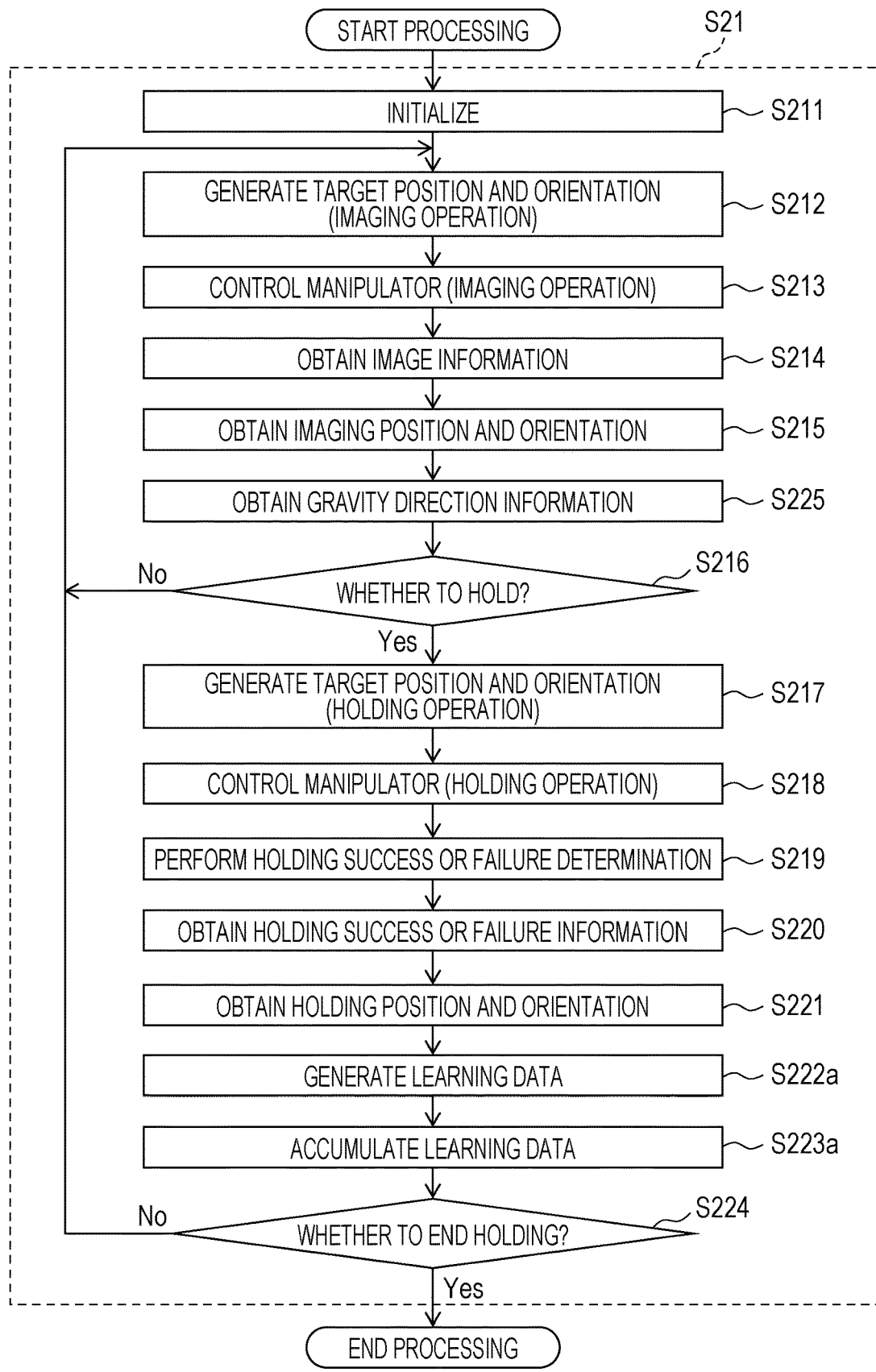
FIG. 10 is a flow chart illustrating processing by the information processing apparatus according to the third exemplary embodiment.

FIG. 10 is a flow chart illustrating a procedure of the learning data generation processing executed by the information processing apparatus 120A in a step corresponding to S21 in FIG. 4. This processing in FIG. 10 is similar to that of FIG. 5 except that the processing in S225 is added after S215 in FIG. 5, and the processings in S222 and S223 are replaced with the processing in S222a and S223a. Therefore, the same step number as in FIG. 5 is assigned to the part where the same processing as in FIG. 5 is performed, and hereinafter, different parts in the processings will be mainly described.

In S225, the gravity direction information obtaining unit 128 obtains the gravity direction information. After the control of the manipulator 400 is performed in S213, the obtaining of the image in S214 and the obtaining of the imaging position and orientation in S215 are performed, but at the same time, the obtaining of the gravity direction information is also performed. In a case where the images are captured plural times, the gravity direction information obtaining unit 128 obtains the gravity direction information at the same time as the imaging position and orientation for each imaging.

In S222a, the learning data generation unit 129 associates the learning information input from the learning information obtaining unit 121 with the gravity direction information input from the gravity direction information obtaining unit 128 and the image input from the image obtaining unit 124 and generates the learning data. Subsequently, the learning data generation unit 129 outputs the generated learning data to the learning data accumulation unit 130. In S223a, the learning data accumulation unit 130 saves the learning data generated in S222a.

In a step corresponding to S22 in FIG. 4, the learning apparatus 220A uses the learning data saved by the information processing apparatus 120A to perform the learning of the learning model and saves the learning model. Specifically, the learning apparatus 220A generates the learning model on the basis of the learning data accumulated in S223a in FIG. 10. When this model is used, while the image is set as an input, the position and orientation for the manipulator 400 to holding the target object 1 is output with respect to the image, and it is possible to obtain the information indicating how likely the holding of the target object 1 succeeds in which position and orientation. According to the present exemplary embodiment, since the gravity direction information is added to the learning data, the difference from S22 described according to the above-described first exemplary embodiment resides in thin the holding position and orientation are output by also taking the gravity direction into account.

In a step corresponding to S23 in FIG. 4, the recognition apparatus 320A obtains the image from the imaging apparatus 500 and recognizes the target object in the image by using the learning model saved in the learning apparatus 220A to generate the position and orientation of the manipulator 400 for the holding of the target object. At this time, the recognition apparatus 320A generates the holding position and orientation while the image and the gravity direction information are set as the inputs. In this manner, the recognition apparatus 320A generates the holding position and orientation by also taking the gravity direction information into account. Subsequently, the recognition apparatus 320A controls the manipulator 400 such that the manipulator 400 is moved to the generated holding position and orientation and outputs the holding trigger to the holding apparatus 600 to execute the holding operation of the target object 1 by the holding apparatus 600.

As described above, the robot system 2000A according to the present exemplary embodiment further includes the orientation sensor 700 configured to obtain the orientation of the manipulator 400 that can move the imaging apparatus 500, and the information processing apparatus 120A obtains the orientation information from the orientation sensor 700. Subsequently, the information processing apparatus 120A obtains the gravity direction information indicating the gravity direction in the image captured by the imaging apparatus 500 on the basis of the orientation information obtained from the orientation sensor 700 and generates the learning data by associating the gravity direction information together with the learning information.

With this configuration, the learning data can be generated by also associating the absolute position and orientation information in addition to the relative position and orientation information between the manipulator 400 and the target object 1. In this manner, even in a case where the orientation of the manipulator 400 is changed, when the gravity direction information is also added to the image used for the learning, the still more satisfactory holding position and orientation can be learnt on the basis of the situation which is not found by using only the image, and it is possible to improve the holding success rate.

Modified Example of the Third Exemplary Embodiment

According to the present exemplary embodiment, the case has been described where the gravity direction information obtained by the orientation sensor 700 is used, but other information from another sensor may also be used. For example, magnetic field information may also be obtained by using a magnetic sensor to be associated with the image.

Fourth Exemplary Embodiment

Next, a fourth exemplary embodiment of the present invention will be described.

According to the first exemplary embodiment, the second exemplary embodiment, and the third exemplary embodiment described above, the case has been described where the manipulator 400 is simply moved to the target holding position and orientation to perform the holding operation at the time of the execution of the holding operation upon the learning data generation. According to the fourth exemplary embodiment, a case will be described where contact information between the holding apparatus 600 and the object is obtained at the time of the execution of the holding operation described above, and the holding operation is performed on the basis of the contact information.

Apparatus Configuration

Figure 11:
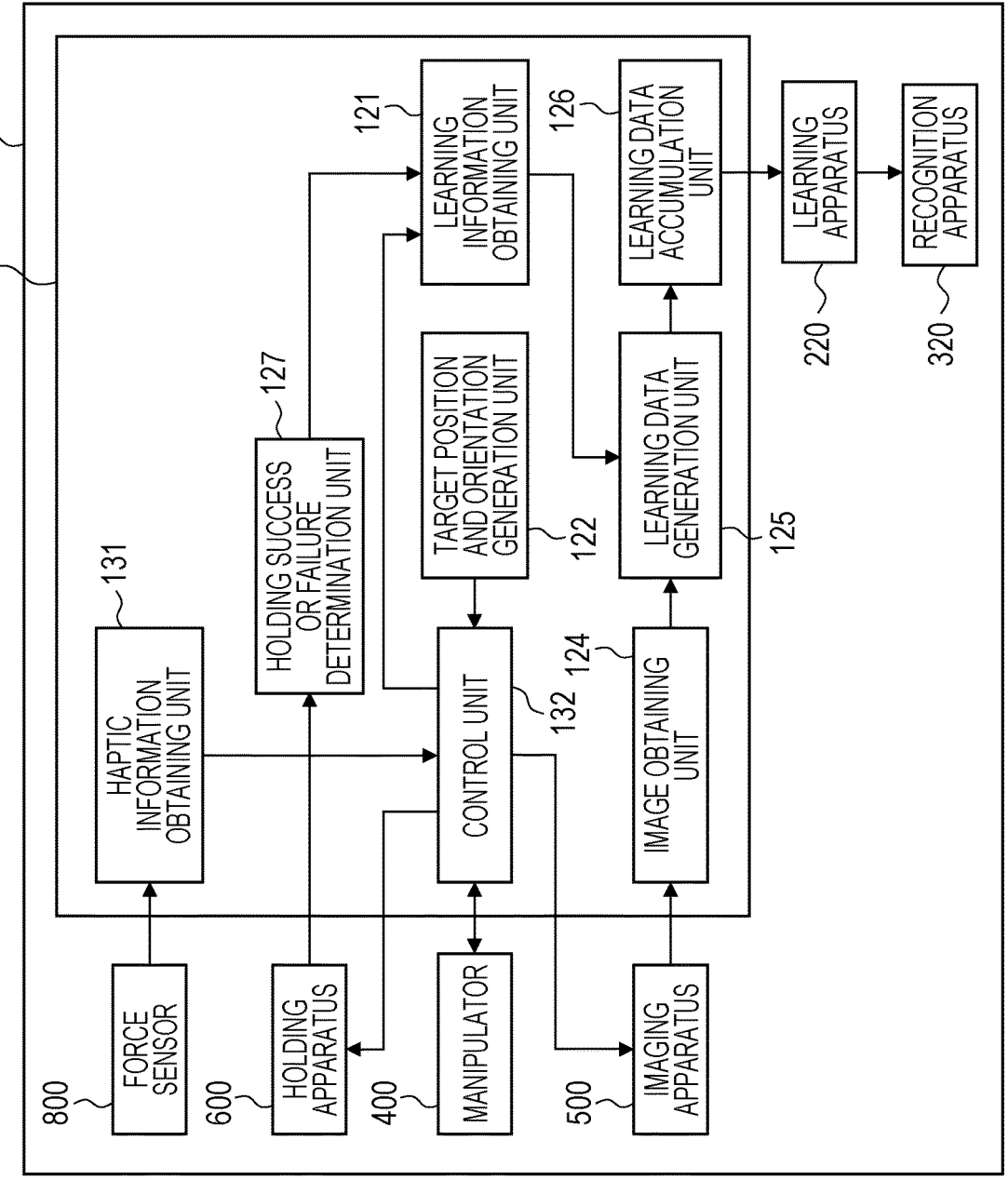
FIG. 11 illustrates a configuration of the information processing apparatus according to a fourth exemplary embodiment.

FIG. 11 is a block diagram illustrating a configuration of a robot system 2000B according to the present exemplary embodiment. In FIG. 11, the same reference sign is assigned to the part having the similar configuration as that in FIG. 2, and hereinafter, a part having a different configuration will be mainly described.

The robot system 2000B includes an information processing apparatus 120B. The information processing apparatus 120B has a configuration in which a haptic information obtaining unit 131 is added to the information processing apparatus 120 illustrated in FIG. 2. In addition, the control unit 123 of FIG. 2 is replaced with a control unit 132 having different processing contents.

Moreover, the robot system 2000B is newly provided with a force sensor 800 configured to measure haptic information when the manipulator 400 holds the target object 1.

According to the first exemplary embodiment, the second exemplary embodiment, and the third exemplary embodiment described above, the case has been described where the manipulator 400 is moved towards the target holding position and orientation generated in S217 at the time of the learning data generation to obtain the holding position and orientation at the time of the holding operation as the learning information. However, in a case where the target object 1 is wrapped in plastic, distance information is not accurately measured because of halation, or the position and orientation of the object inside the plastic are erroneously calculated in some cases. In the above-described case, the manipulator 400 is not moved to the holding position and orientation generated in S217, or even when the manipulator 400 is moved to the holding position and orientation generated in S217, the target object 1 is not held.

In view of the above, according to the present exemplary embodiment, the force sensor 800 is attached to a part corresponding to the leading end of the manipulator 400 and the root of the holding apparatus 600, and it is determined whether or not the holding apparatus 600 contacts the target object 1 at the time of the execution of the holding operation. Subsequently, the determination result is used to correct deviations of the target holding position and orientation derived from an error of the recognition of the target object 1.

The force sensor 800 is attached to a position where external force applied to the holding apparatus 600 can be measured. The force sensor 800 is constituted by a strain gauge or a piezoelectric element. The force sensor 800 measures force applied to the holding apparatus 600 (reactive force) when the holding apparatus 600 is in contact with the target object 1 or the peripheral object 2 and outputs the haptic information (contact information) corresponding to the measurement result to the information processing apparatus 120B. The force sensor 800 may be a six-axis force sensor (force/torque sensor) or a three-axis force sensor. The force sensor 800 may also be a one-dimensional pressure sensor or a contact sensor configured to determine the presence or absence of the contact.

The haptic information obtaining unit 131 obtains the haptic information output from the force sensor 800 and outputs the obtained haptic information to the control unit 132. The haptic information obtaining unit 131 can be constituted by a memory (RAM), for example. The control unit 132 can determine whether or not the holding apparatus 600 is in contact with the target object 1 or the peripheral object 2 on the basis of the haptic information input from the haptic information obtaining unit 131.

Recognition Processing

The flow of the recognition processing by the robot system 2000B according to the present exemplary embodiment is similar to that of FIG. 4. In S21 in FIG. 4, the processing similar to FIG. 5 is executed. It should be noted however that the contents of the processing in S218 in FIG. 5 are different from those of the above-described first exemplary embodiment. The processing in S218 is processing for the control unit 132 to control the manipulator 400 for the holding operation. Hereinafter, a detail of the processing in S218 will be described with reference to FIG. 12.

Figure 12:
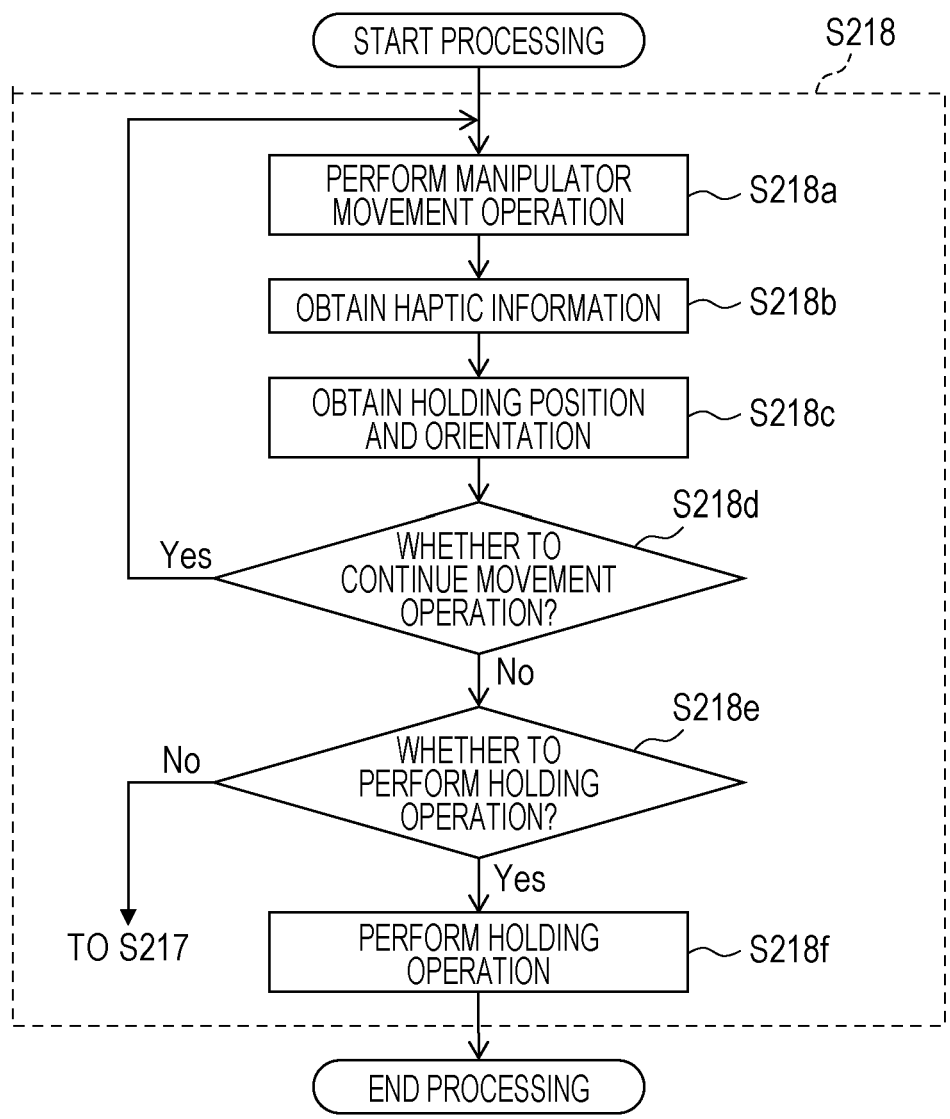
FIG. 12 is a flow chart illustrating the manipulator control according to the fourth exemplary embodiment.

FIG. 12 is a flow chart illustrating a procedure of the manipulator control processing executed by the information processing apparatus 120B in S218 in FIG. 5. It should be noted that the processing executed in S218 is repeatedly performed at a high speed at sampling time intervals.

First, in S218a, the control unit 132 controls the manipulator 400 to be moved towards the holding position and orientation generated in S217 of FIG. 5. Next, in S218b, the haptic information obtaining unit 131 obtains the haptic information from the force sensor 800. In S218c, the control unit 132 obtains the holding position and orientation of the manipulator 400.

In S218d, the control unit 132 determines whether or not the movement operation of the manipulator 400 is continued. Specifically, the control unit 132 compares the current holding position and orientation obtained in S218c with the target holding position and orientation generated in S217 to determine whether or not the manipulator 400 reaches the target holding position and orientation. The control unit 132 also determines whether or not the holding apparatus 600 is in contact with the object on the basis of the haptic information obtained in S218b. In a case where it is determined that the manipulator 400 reaches the target holding position and orientation and also the holding apparatus 600 is in contact with the object, the control unit 132 determines that the movement operation is ended and shifts to S218e.

On the other hand, in a case where it is determined that the manipulator 400 does not reach the target holding position and orientation, the control unit 132 determines that the manipulation movement operation is still continued and returns to S218a. It should be noted however that, when the obtained haptic information is higher than a previously set value even in a case where the manipulator 400 does not reach the target holding position and orientation, it is determined that the manipulator 400 does not moves towards the target holding position and orientation any closer, and the flow shifts to S218e. In this case, although the manipulator 400 does not reach the target holding position and orientation, the position and orientation of the manipulator 400 at this time are treated as the holding position and orientation at the time of the holding operation. That is, in S221 which will be executed in a subsequent stage, the learning information obtaining unit 121 obtains the holding position and orientation at this time as the learning information.

In addition, even though the manipulator 400 reaches the target holding position and orientation, it may be determined in some cases that the holding apparatus 600 is not in contact with the object on the basis of the value of the obtained haptic information. In this case, it is determined that the manipulation movement operation is continued, and the flow returns to S218a. Herein, a distance and a direction may be set for performing the further movement with respect to the target holding position and orientation, or a threshold of the force may be set such that the operation is continued until the force at the time of the contact exceeds the threshold as a continuation condition for the manipulation movement operation. Other condition may also be set. In a case where the force at the time of the contact is higher than the threshold, the position and orientation of the manipulator 400 at this time are treated as the holding position and orientation at the time of the holding operation.

In S218e, the control unit 132 determines whether or not the holding operation by the manipulator 400 is executed. At this time, the control unit 132 refers to a shift condition from S218d and determines whether or not the holding operation is executed. Specifically, the control unit 132 determines in the following manner whether or not the holding operation is executed. It should be noted however that the determination method does not necessarily need to use the following condition.

In S218d, in a case where the manipulator 400 reaches the target holding position and orientation and also it is determined that the holding apparatus 600 is in contact with the object so that the flow shifts to S218e, the control unit 132 determines that the holding operation is executed. In addition, in a case where the obtained haptic information is higher than a previously set value and the flow shifts to S218e although the manipulator 400 does not reach the target holding position and orientation, the control unit 132 also determines that the holding operation is executed since a state is established in which the target object 1 can be held.

On the other hand, in a case where the holding apparatus 600 is not in contact with the object from the value of the obtained haptic information although the manipulator 400 reaches the target holding position and orientation, when the set condition is satisfied and the flow shifts to S218e, the determination varies in accordance with the set conditions. For example, in a case where the distance for performing the further movement with respect to the target holding position and orientation has been set, since the target object 1 is not contacted even after the movement by the set distance, it is determined that the holding operation is not executed. In this case, the flow returns to S217 in FIG. 5, and the generation of the target position and orientation for the holding operation is performed again. In a case where the threshold is set such that the operation is continued until the force at the time of the contact exceeds the threshold, since there is a possibility that the target object 1 is contacted, it is determined that the holding operation is executed.

In a case where it is determined in S218e that the holding operation by the manipulator 400 is executed, the control unit 132 shifts to S218f and controls and causes the holding apparatus 600 to perform the holding operation of the target object 1.

As described above, the robot system 2000B according to the present exemplary embodiment further includes the force sensor 800 configured to obtain the reactive force when the holding apparatus 600 contacts the object, and the information processing apparatus 120B obtains the haptic information (contact information) from the force sensor 800. Subsequently, the information processing apparatus 120B determines whether or not the holding apparatus 600 is in contact with the target object 1 at the time of the holding operation on the basis of the haptic information obtained from the force sensor 800.

With this configuration, the information processing apparatus 120B can determine a case where the manipulator 400 contacts the target object 1 before the manipulator 400 reaches the target holding position and orientation for the holding operation or a case where the manipulator 400 is not in contact with the target object 1 although the manipulator 400 reaches the target holding position and orientation. That is, the information processing apparatus 120B can determine whether or not the target holding position and orientation are the position and orientation in which the target object 1 can be held.

Subsequently, the information processing apparatus 120B can determine whether the holding operation is executed by taking the result of the above-described determination into account. For example, in a case where it is determined that the target holding position and orientation are not the position and orientation in which the target object 1 can be held, the information processing apparatus 120B further moves the manipulator 400 from the target holding position and orientation, and it is possible to execute the holding operation in the position and orientation in which the target object 1 can be held. On the other hand, in a case where it is determined that the position and orientation become the position and orientation in which the target object 1 can be held before reaching the target holding position and orientation, the information processing apparatus 120B can execute the holding operation at this time. Therefore, it is possible to improve the holding success rate of the target object 1.

In this manner, the information processing apparatus 120B decides the holding position and orientation having the high holding success rate of the target object 1 on the basis of the haptic information (contact information) obtained from the force sensor 800 and obtains the learning information. That is, the information processing apparatus 120B can correct and complement the learning information (holding position and orientation). Therefore, even in a case where the target holding position and orientation are actually deviated from the position and orientation in which the target object 1 can be held, it is possible to execute the holding operation in the holding position and orientation where the holding operation succeeds, and the learning information of the holding success can be efficiently collected. As a result, it is possible to shorten the learning time.

Modified Example of the Fourth Exemplary Embodiment

According to the present exemplary embodiment, the case has been described where the haptic information obtained from the force sensor 800 is used to correct and complement the learning information, but the learning information may be corrected and complemented by using other information from another sensor. For example, proximity sense information may be obtained by using a proximity sensor, the learning information may be corrected and complemented.

Modified Example

According to the above-described respective exemplary embodiments, the case has been described where the imaging apparatus 500 obtains the color image based on RGB and the depth image, but the imaging apparatus 500 may be an apparatus that obtains a monochrome image. The imaging apparatus 500 may also be an apparatus that obtains an infrared image.

In addition, according to the above-described respective exemplary embodiments, the case has been described where the manipulator 400 is the multi-joint robot, but it is sufficient when the manipulator 400 can move at least one of the imaging apparatus 500 and the target object. That is, the manipulator 400 may be a six-axis robot, a parallel link robot, or an orthogonal robot. The manipulator 400 may also be a movement mechanism other than the robot.

Furthermore, according to the above-described respective exemplary embodiments, the case has been described where the learning apparatus performs the learning of the CNN model after the learning data accumulation unit saves the learning data, but the configuration is not limited to the above. For example, the learning may be performed while the learning data is generated to be input to the CNN model.

In addition, according to the above-described respective exemplary embodiments, the case has been described where the CNN corresponding to one type of the deep learning is learnt to constitute a discrimination circuit, but the configuration is not limited to the above. A local binary pattern (LBP), a bag of features (BoF), or the like may be used as the characteristic amount. In addition, a decision tree, a support vector machine (SVM), or the like may be used as the discrimination circuit.

Furthermore, according to the above-described respective exemplary embodiments, the image obtained by the image obtaining unit 124 may be a still image or a moving image. In the case of the moving image, the position and orientation of the manipulator 400 at a time of the moving image are treated as the imaging position and orientation.

In addition, according to the above-described respective exemplary embodiments, the learning target is set as the holding position and orientation in the image. However, in a case where the position and orientation where the holding can be performed do not exist, the position and orientation set as the next imaging candidate may be set as the learning target. With this configuration, even in a case where the position and orientation where the holding can be performed are not determined, a probability that the holding position and orientation may be obtained from different imaging position and orientation is increased.

Furthermore, according to the above-described respective exemplary embodiments, the imaging position and orientation of the manipulator 400 may be determined such that the imaging apparatus 500 performs the imaging within the range of the imaging position and orientation previously specified by the designer (user).

Moreover, according to the above-described respective exemplary embodiments, the information processing apparatus 120 may control the light source 510 to control a state of illumination at the time of the imaging. For example, still more situations may be imaged by changing an on or off state of the light source 510, a state of intensity of the light from the light source 510, or the like in the same imaging position and orientation. Furthermore, the target object 1 can be imaged in the same manner by using coaxial illumination as the light source 510 even when the imaging is performed from different position and orientation.

In addition, according to the above-described respective exemplary embodiments, the learning data may be generated on the basis of the plurality of images obtained by performing the image processing on the image captured by the imaging apparatus 500 at the time of the generation of the learning data. Herein, the image processing includes geometric conversion such as expansion, reduction, or rotation or processing of adding noise or changing brilliance (luminance value) or a color. In this case, the learning data is generated by similarly associating the holding position and orientation corresponding to the image before the image processing with the plurality of images after the image processing. With this configuration, since the plural pieces of learning data can be generated from the single captured image, it is possible to reduce the time for capturing the images used for the generation of the learning data.

Furthermore, according to the above-described respective exemplary embodiments, not only the position and orientation of the manipulator 400 but also, for example, an illumination condition, a background, and other conditions may be changed when the imaging is performed plural times.

Moreover, according to the above-described respective exemplary embodiments, the position and orientation of the manipulator 400 do not necessarily need to be learnt as the holding position and orientation. For example, in a case where a bottom surface of the target object 1 is placed on the plane surface, it is sufficient when only the holding position and a normal direction are learnt.

Furthermore, according to the above-described respective exemplary embodiments, an arbitrary apparatus can be used as the holding apparatus 600 as long as the apparatus has a configuration in which the target object 1 can be held. For example, the holding apparatus 600 may be a suction apparatus or a gripping apparatus such as an opening and closing hand. In a case where the holding apparatus 600 is the suction apparatus, a point where the suction apparatus contacts the target object 1 may be set as the holding position and orientation. In a case where the holding apparatus 600 is the gripping apparatus, a gripping center and a gripping direction may be set as the holding position and orientation.

In addition, according to the above-described respective exemplary embodiments, the imaging apparatus 500 may be an on-hand camera attached to the manipulator 400, or a configuration may also be adopted in which the imaging apparatus 500 is not attached to the manipulator 400 or can be moved by an actuator other than the manipulator 400. That is, the imaging apparatus 500 may be attached in any manner as long as a relative positional relationship with the manipulator 400 is found.

Furthermore, according to the above-described respective exemplary embodiments, the case has been described where the holding success or failure is determined depending on whether or not the target object 1 can be held but may also be determined depending on a success or failure result as a task. The holding success or failure result is determined as failure because of the failure of the task even when the holding succeeds as in the following example. The target object 1 is placed in a box, and the holding of the target object 1 succeeds, but the box is displaced after the holding in some cases. In this case, a marker is put on the box, and the displacement of the box is obtained by recognizing the marker. In a case where the box is displaced by an allowed range or above, the holding failure is determined, and the holding success or failure information supplied as the training signal is set as failure. In addition, the target object 1 is placed in the box, and the holding of the target object 1 succeeds. However, when the target object 1 is lifted up, an object other than the target object 1 inside the box falls, or excessive force is applied to an object other than the target object 1 inside the box, and the object breaks. In the above-described case, the holding success or failure result is also similarly determined as failure.

According to the exemplary embodiments of the present invention, it is possible to easily generate the learning data for holding the target object.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-058864, filed Mar. 24, 2017, which is hereby incorporated by reference herein in its entirety.

What is claimed is:
1. An information processing apparatus comprising:
   at least one processor programmed to cause the information processing apparatus to perform operations comprising:
   a first decision that decides a holding position and orientation of a manipulator as targets for performing the holding of a target object;

a first control that moves the manipulator on a basis of the holding position and orientation decided by the first decision and instructs to perform the holding;

a determination that determines success or failure of the holding of the target object;

a first obtaining that obtains the holding position and orientation of the manipulator and holding success or failure information of the target object in the holding position and orientation determined by the determination;

a second obtaining that obtains an image in which the target object is imaged from different imaging position and orientation sets when the holding of the target object is performed; and a generation that generates learning data in which images obtained by the second obtaining are each associated with the holding position and orientation and the holding success or failure information obtained by the first obtaining.

2. The information processing apparatus according to claim 1, wherein the learning data is a pair of the image obtained by the second obtaining and a label serving as a training signal, and wherein the label includes relative position and orientation information between imaging position and orientation of the manipulator when the imaging of the image is performed and the holding position and orientation of the manipulator when the holding of the target object is performed and the holding success or failure information.

3. The information processing apparatus according to claim 1, wherein the first control instructs to perform the holding when it is determined that the target object can be held on a basis of contact information of the manipulator with the target object.

4. The information processing apparatus according to claim 1, wherein the first obtaining obtains the holding position and orientation on a basis of contact information of the manipulator with the target object.

5. The information processing apparatus according to claim 1, the operations further comprising:

a third obtaining that obtains gravity direction information indicating a gravity direction in the image obtained by the second obtaining, wherein the generation further generates the learning data on a basis of the gravity direction information obtained by the third obtaining.

6. The information processing apparatus according to claim 1, the operations further comprising:

a second decision that decides imaging position and orientation set as targets for imaging the target object; and a second control that moves at least one of the imaging apparatus that images the target object and the target object on a basis of the imaging position and orientation decided by the second decision and instructs the imaging apparatus to perform the imaging.

7. The information processing apparatus according to claim 6, wherein the second decision decides the imaging position and orientation set as the targets in a range of imaging position and orientation specified by a user.

8. The information processing apparatus according to claim 6, wherein the second control further controls a state of illumination at a time of the imaging of the target object by the imaging apparatus.

9. The information processing apparatus according to claim 1, the operations further comprising:

a learning that learns a model using the learning data generated by the generation.

10. The information processing apparatus according to claim 9, the operations further comprising:

a recognition that recognizes the target object in the image on a basis of the model learnt by the learning and decides the recognized target object as a holding target.

11. The information processing apparatus according to claim 10, wherein the recognition decides the holding position and orientation obtained by the first obtaining and imaging position and orientation for imaging the image obtained by the second obtaining on a basis of the model learnt by the learning while the image is set as an input.

12. The information processing apparatus according to claim 1, wherein the first obtaining obtains information including the holding position and orientation and the holding success or failure information as learning information related to the target object set as a target of imaging performed plural times by the manipulator, wherein the second obtaining obtains a plurality of images in which the target object is imaged plural times, and wherein the generation generates the learning data on a basis of the learning information obtained by the first obtaining, the plurality of images obtained by the second obtaining, and imaging position and orientation.

13. The information processing apparatus according to claim 1, further comprising:

an imaging apparatus that images the target object; and
the manipulator that can move the imaging apparatus.

14. The information processing apparatus according to claim 13, further comprising:

an orientation sensor that obtains an orientation of the manipulator.

15. The information processing apparatus according to claim 1, further comprising:

a holding apparatus that can hold the target object; and
the manipulator that can move the holding apparatus.

16. The information processing apparatus according to claim 15, further comprising:

a force sensor that obtains reactive force when the holding apparatus contacts an object.

17. The information processing apparatus according to claim 1, wherein the holding of the target object is executed by gripping or sucking the target object.

18. An information processing method comprising:

deciding a holding position and orientation of a manipulator as targets for performing the holding of a target object;

moving the manipulator on a basis of the holding position and orientation decided and instructing to perform the holding;

determining success or failure of the holding of the target object;

obtaining the holding position and orientation of the manipulator and holding success or failure information of the target object in the holding position and orientation determined in the determining;

obtaining an image in which the target object is imaged from different imaging position and orientation sets when the holding of the target object is performed; and generating learning data in which obtained images are each associated with the obtained holding position and orientation and the obtained holding success or failure information.

19. A non-transitory computer-readable storage medium storing a program for causing a computer to execute respective steps of an information processing method, the information processing method comprising:
- deciding a holding position and orientation of a manipulator as targets for performing the holding of a target object;
- moving the manipulator on a basis of the holding position and orientation decided and instructing to perform the holding;
- determining success or failure of the holding of the target object;
- obtaining the holding position and orientation of the manipulator and holding success or failure information of the target object in the holding position and orientation determined in the determining;
- obtaining an image in which the target object is imaged from different imaging position and orientation sets when the holding of the target object is performed; and
- generating learning data in which obtained images are each associated with the obtained holding position and orientation and the obtained holding success or failure information.

20. An information processing apparatus comprising:
- at least one processor programmed to cause the information processing apparatus to perform operations comprising:
- a decision that decides a holding position of a manipulator as targets for performing a holding of a target object;
- a control that moves the manipulator based on the holding position and instructs to perform the holding;
- a first obtaining that obtains holding success or failure information of the target object when the manipulator performs a process of holding the target object based on the holding position of the manipulator;
- a second obtaining that obtains images by imaging the target object from various imaging positions; and
- a generation that generates learning data by associating the holding position and the holding success or failure information corresponding to one holding operation obtained by the first obtaining with each image obtained by the second obtaining.

* * * * *